(12) United States Patent
Nishio

(10) Patent No.: US 7,707,414 B2
(45) Date of Patent: Apr. 27, 2010

(54) INFORMATION PROCESSING DEVICE FOR AUTHENTICATION PROCESSING, INFORMATION PROCESSING METHOD, AND CONTROL PROGRAM FOR EXECUTING THE METHOD

(75) Inventor: Masahiro Nishio, Higashiyamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 1276 days.

(21) Appl. No.: 11/214,223

(22) Filed: Aug. 29, 2005

(65) Prior Publication Data
US 2006/0046691 A1 Mar. 2, 2006

(30) Foreign Application Priority Data
Aug. 31, 2004 (JP) ............................. 2004-253198

(51) Int. Cl.
*H04L 9/00* (2006.01)
(52) U.S. Cl. ...................... 713/168; 455/110; 455/111; 726/2
(58) Field of Classification Search ....................... None
See application file for complete search history.

(56) References Cited

U.S. PATENT DOCUMENTS

2003/0154413 A1 * 8/2003 Shigeeda .................... 713/202

2005/0207578 A1 * 9/2005 Matsuyama et al. ......... 380/231

FOREIGN PATENT DOCUMENTS

JP 2003-228509 A 8/2003

* cited by examiner

*Primary Examiner*—Nasser Moazzami
*Assistant Examiner*—Fikremariam Yalew
(74) *Attorney, Agent, or Firm*—Canon U.S.A. Inc., I.P. Division

(57) ABSTRACT

An information processing method for an information processing device which performs multiple types of authentication processing performing authentication processing before accepting at least one or more independent services and executing the aforementioned services. The information processing method includes: a receiving step for receiving service requests including the authentication information from the external terminal; a calling step for calling the authentication processing which performs authentication processing corresponding to the services requested from the external terminal, referencing first information which describes the authentication processing calling procedure corresponding to the service; an output step for receiving and outputting results of the called authentication processing; and a calling step for calling the accepted services according to the results of the authentication processing output in the output step.

9 Claims, 19 Drawing Sheets

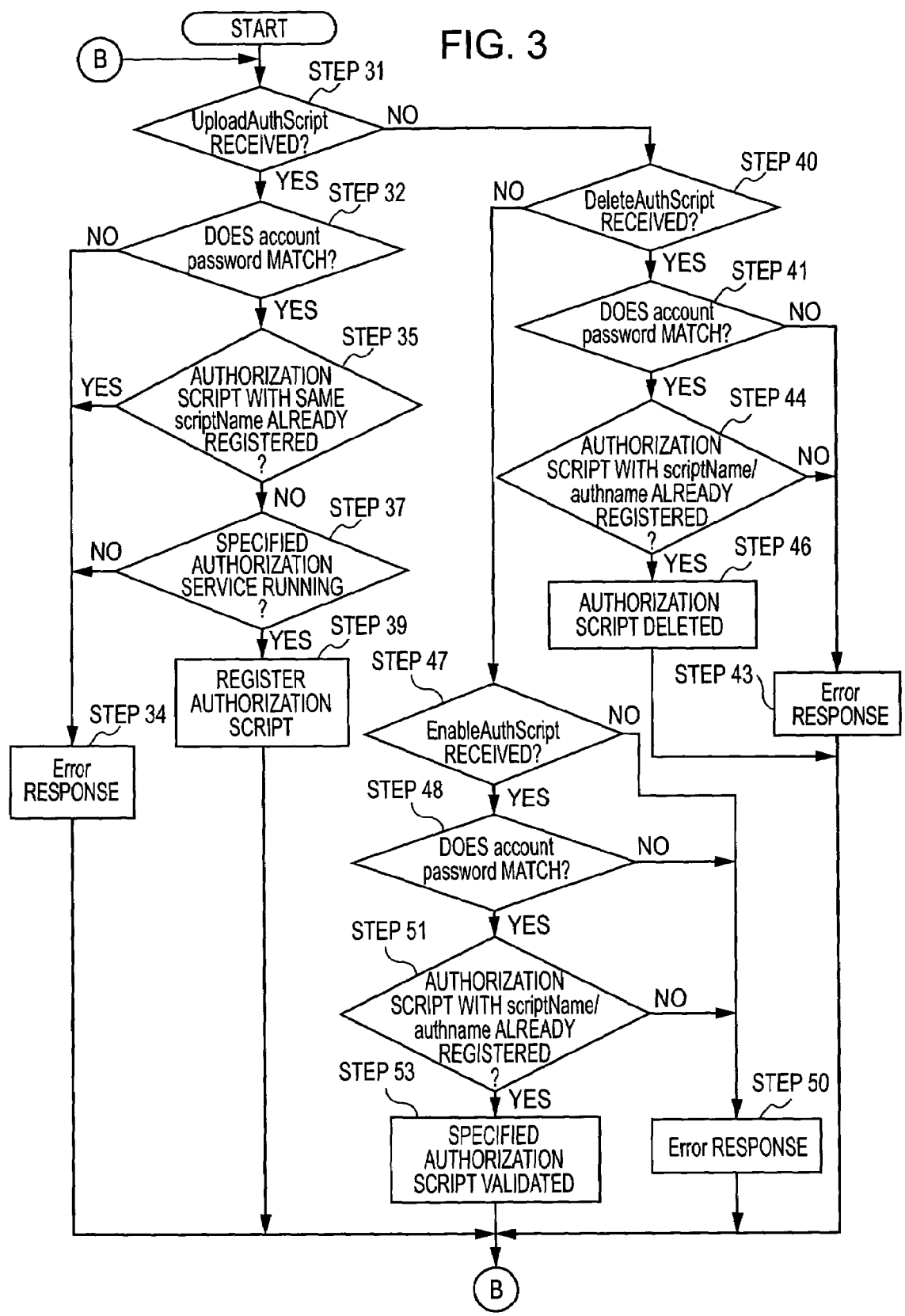

FIG. 5

```
<Envelope>
<Header>
        <Action>http//abc.org/mfp/PrintService</Action>  ~51
        <MessageID> uuid0a6dc791-2be6-4991-9af1-454778a1917a</MessageID>
        <To> http//abc.org/mfp</To>
        <Security>
                <UsernameToken>  ~52
                        <Username>ABCDEF</Username>  ~53
                        <Password Type="...#PasswordDigest">
                        lEdZep5nTBtlerlisTo60wRbc==
                        </Password>
                        <Nonce>PsCAjo08nyQiaTlo== </Nonce>
                        <Created>2004-06-30T012345Z</Created>
                </UsernameToken>
        </Security>
</Header>

<Body>
        <CreateJob>
                <JobName>MyJob</JobName>  ~54
                <Color>FULLCOLOR</Color>  ~55
                <Copy>100</Copy>  ~56
                <Sides>ONESIDE</Sides>  ~57
                <MediaSize>A4</MediaSize>  ~58
                <MediaType>PHOTOQUALITY</MediaType>  ~59
                <PrintQuality>HIGH</PrintQuality>  ~5A
        </CreateJob>
</Body>
</Envelope>
```

FIG. 6

```
<AccessControlScript>
        <scriptName>SCRIPTType1</scriptName>
        <authName>AUTHORIZATION B</authName>
        <RequestorInfo username="XXX">
                <Color>BLACKANDWHITE</Color>          ~ 61
                <Copy>10</Copy>                        ~ 62
                <Sides>TWO-SIDE</Sides>                ~ 63
                <MediaSize>A4</MediaSize>              ~ 64
                <MediaType>PLAINPAPAER</MediaType>     ~ 65
                <PrintQuality>HIGH</PrintQuality>      ~ 66
        </RequestorInfo>
        <RequestorInfo username="YYY">
                ***********************
                ***********************
                ***********************
        </RequestorInfo>

<RequestorInfo username="ZZZ">
                ***********************
                ***********************
                ***********************
        </RequestorInfo>
</AccessControlScript>
```

FIG. 7

```
<Envelope>
<Header>
        <Action>http//abc.org/mfp/PrintService</Action>  ~51
        <MessageID> uuid0a6dc791-2be6-4991-9af1-454778a1917a</MessageID>
        <To> http//abc.org/mfp</To>
        <Assertion>
                <AuthenticationStatement
                        Decision="Permit"
                                Resource="http://abc.org/mfp/AuthorizationB>
                                <Subject>http://www.abc.org/PrintService</Subject>
                </AuthenticationStatement>
        </Assertion>
        <ModifiedRequest>  ~71
                <Color>FULLCOLOR</Color>
                <Copy>100</Copy>
                <Sides>ONESIDE</Sides>
                <MediaType>PHOTOQUALITY</MediaType>
        </ModifiedRequest>
</Header>

<Body>
        <CreateJob>
                <JobName>MyJob</JobName>  ~54
                <Color>BLACKANDWHITE</Color>  ~55
                <Copy>10</Copy>  ~56
                <Sides>TWO-SIDE</Sides>  ~57
                <MediaSize>A4</MediaSize>  ~58
                <MediaType>PLAINPAPAER</MediaType>  ~59
                <PrintQuality>HIGH</PrintQuality>  ~5A
        </CreateJob>
</Body>
</Envelope>
```

FIG. 8

```xml
<?xml version="1.0" ?>
<xmlscript name="Sample1">
        <mapping>
                <Service>http://abc.org/mfp/PrintService</Service>
                <AuthService>http://abc.org/mfp/AuthenticationA</AuthService>
        </mapping>
        <mapping>
                <Service> http://abc.org/mfp/ScanService</Service>
                <AuthService> http://abc.org/mfp/AuthenticationB</AuthService>
        </mapping>
        <mapping>
                <Service> http://abc.org/mfp/StorageService</Service>
                <AuthService> http://abc.org/mfp/AuthorizationB</AuthService>
        </mapping>
        <mapping>
                <Service> http://abc.org/mfp/FaxService</Service>
                <AuthService> https://zzz.org/server/AuthenticationC</AuthService>
        </mapping>
</xmlscript>
```

FIG. 11

```
<?xml version="1.0" ?>
<xmlscript name="Sample4">
    <mapping>
        <Service>http://abc.org/mfp/PrintService</Service>
        <AuthService>http://abc.org/mfp/AuthenticationA</AuthService>
    </mapping>                                                          } ~ 121
    <mapping>
        <Service> http://abc.org/mfp/ScanService</Service>
        <AuthService> http://abc.org/mfp/AuthenticationA</AuthService>
    </mapping>                                                          } ~ 122
</xmlscript>
```

FIG. 12

```
<?xml version="1.0" ?>
<xmlscript name="Sample5">
    <mapping>
        <Service>http://abc.org/mfp/PrintService</Service>
        <AuthService>http://abc.org/mfp/AuthenticationB</AuthService>
        <AuthService>http://abc.org/mfp/AuthorizationB</AuthService>
    </mapping>
</xmlscript>
```

FIG. 13

```xml
<?xml version="1.0" ?>
<xmlscript name="Sample6">
    <SecurityPolicy level="1">
        <mapping>
            <Service>http://abc.org/mfp/PrintService</Service>
            <AuthService></AuthService>
        </mapping>
    </SecurityPolicy>
    <SecurityPolicy level="2">
        <mapping>
            <Service>http://abc.org/mfp/PrintService</Service>
            <AuthService> http://abc.org/mfp/AuthenticationA</AuthService>
        </mapping>
    </SecurityPolicy>
    <SecurityPolicy level="3">
        <mapping>
            <Service>http://abc.org/mfp/PrintService</Service>
            <AuthService> http://abc.org/mfp/AuthenticationB</AuthService>
        </mapping>
    </SecurityPolicy>
    <SecurityPolicy level="4">
        <mapping>
            <Service>http://abc.org/mfp/PrintService</Service>
            <AuthService>https://zzz.org/server/AuthenticationC</AuthService>
        </mapping>
    </SecurityPolicy>
</xmlscript>
```

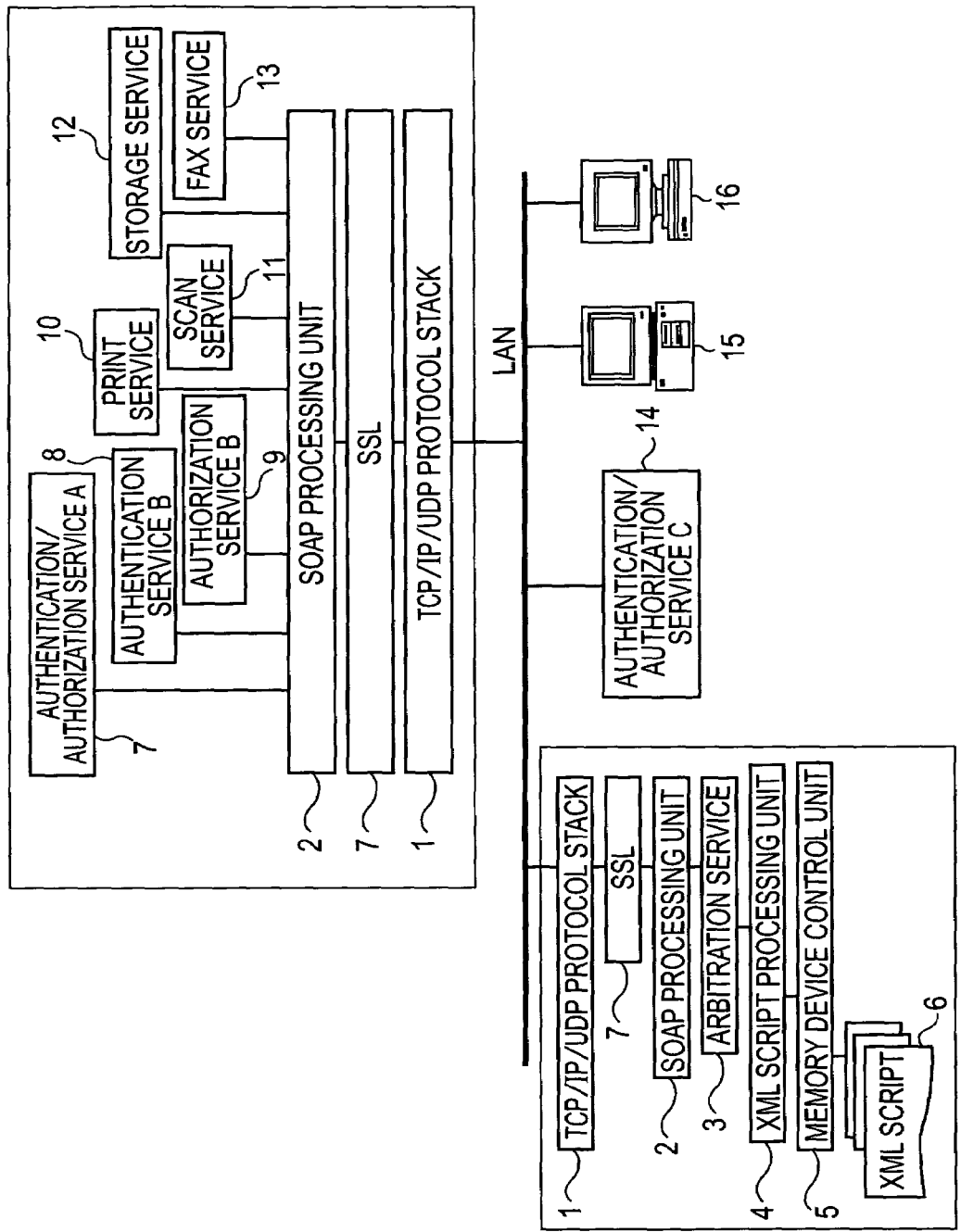

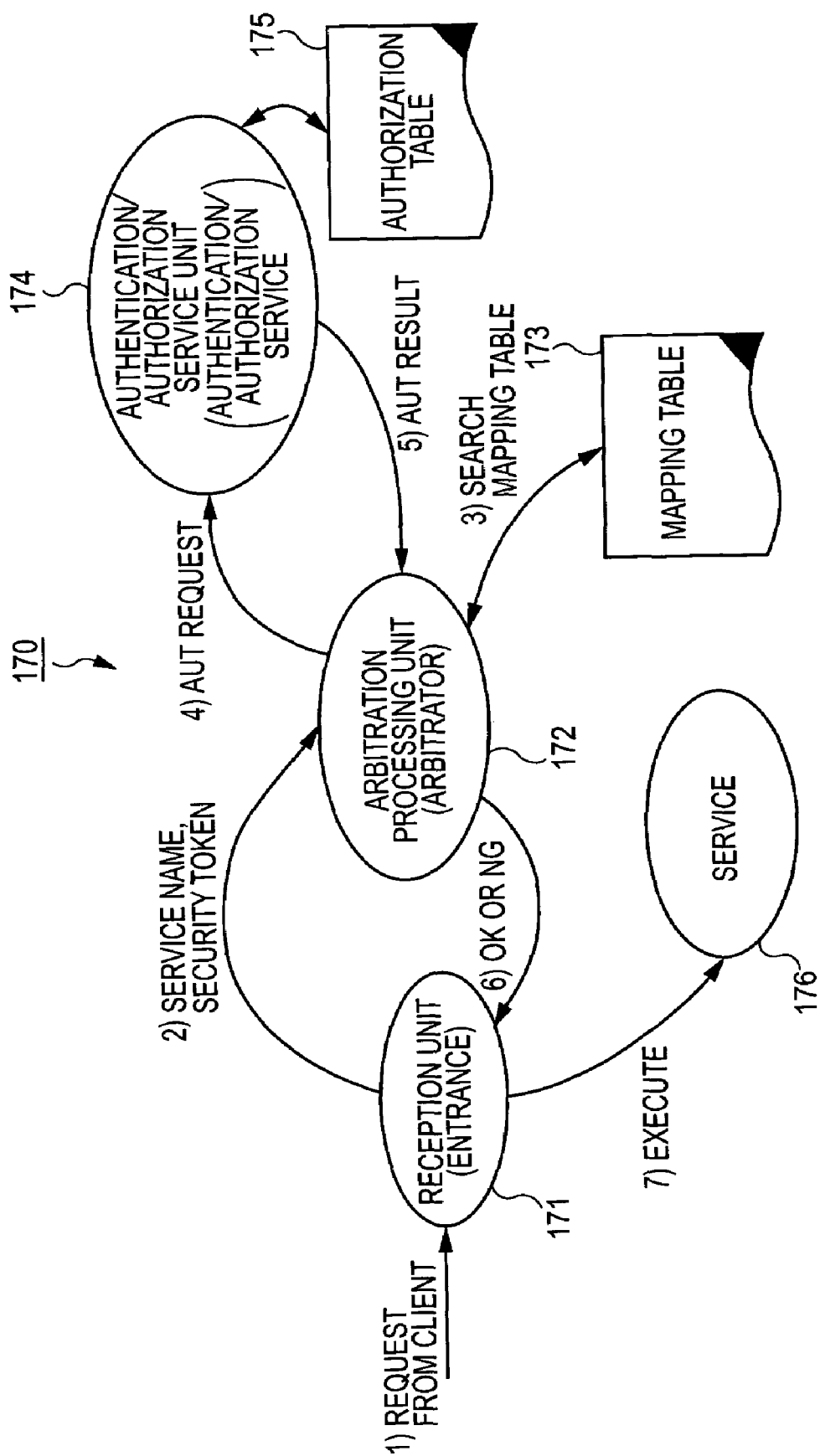

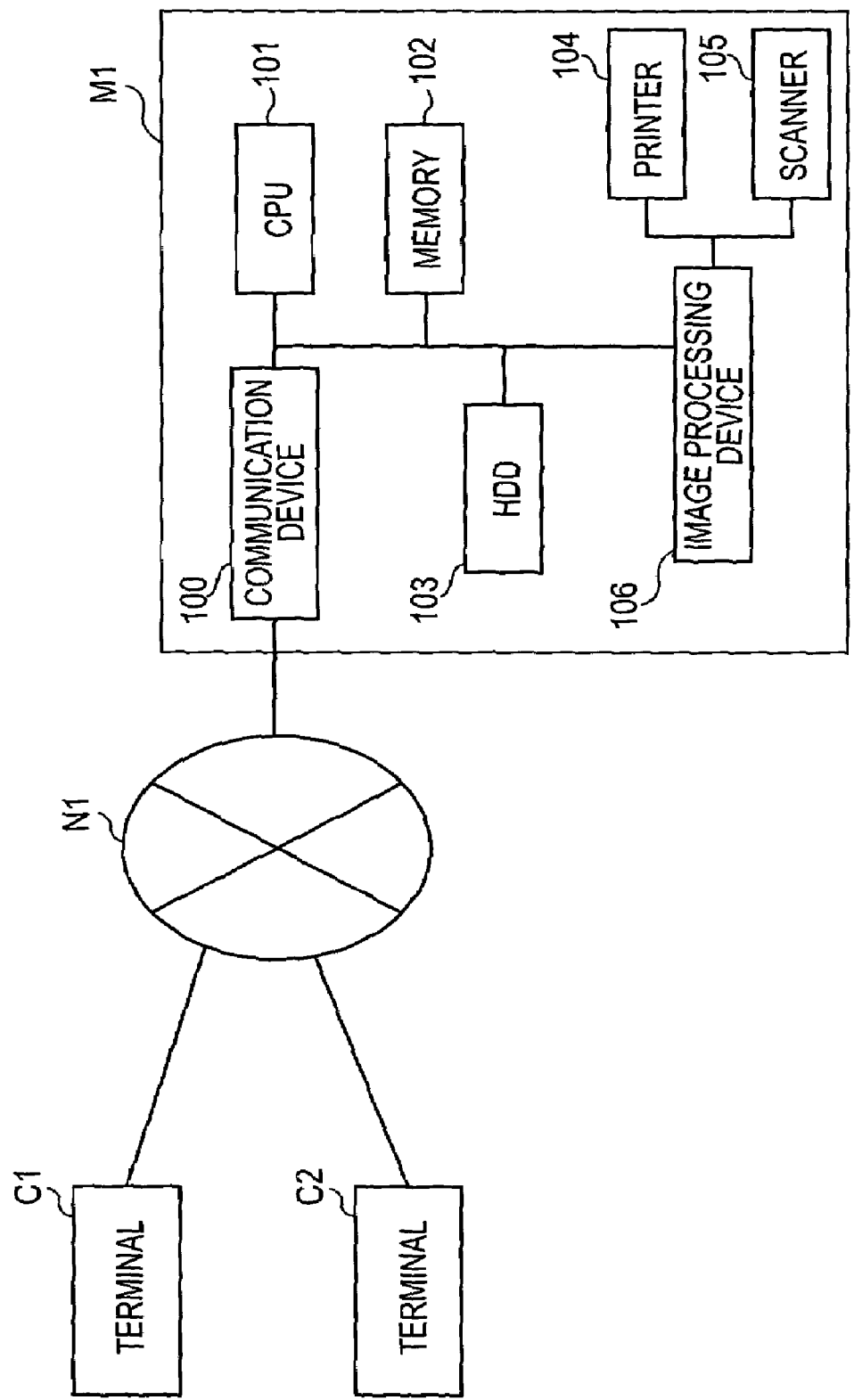

INFORMATION PROCESSING DEVICE FOR AUTHENTICATION PROCESSING, INFORMATION PROCESSING METHOD, AND CONTROL PROGRAM FOR EXECUTING THE METHOD

BACKGROUND OF THE INVENTION

1. Field of the Invention

The present invention relates to a peripheral device corresponding to a network, an information processing device for controlling this peripheral device, an information processing method, and a program thereof.

2. Description of the Related Art

In recent years, XML (eXtensible Markup Language) which is a structured language, has been used in a broad range of fields in business document management, messaging, and databases, and the application range thereof continues to increase. A noteworthy example is the application to a Web service which is a distributed object model utilizing XML-SOAP (Simple Object Access Protocol). Further, since the advent of this Web service, conversions from the conventional object oriented model to a service oriented architecture (SOA: Service Oriented Architecture) have been gradually occurring.

Here, the term "service orientated architecture" refers to an architecture for promptly building and providing a business solution, which divides the process into units of services, while maintaining high reliability and low cost, by reusing and modifying existing services.

On one hand, powerful security is being required for business solutions. Particularly with business solutions which are built on a network, user information, protection of user data, and further, the identification and authentication of an individual has been a crucial issue. On the other hand, in order to improve convenience and facilitation of network solutions, requests have increased for single sign-on, Federated Identity, and the like.

Even a service orientated architecture which uses Web services as an infrastructure is not an exception, and even with the same service, depending on the environment in which the service is used, the security level, and system configuration, flexible handling such as different authentication and authorization processing for each becomes necessary. For example, for one user authentication, there are a wide range of methods such as a simple password authentication, a personal identification number (PIN) code authentication, an integrated circuit (IC) card authentication, biometrics, and so forth. Also, in the case of integrating multiple services, and building and providing a new service, the various differing authentication and authorization units are requested to be integrated, and the establishment of units to provide an environment of a single sign-on and the like is demanded (for example, see Japanese Patent Laid-Open No. 2003-228509).

In other words, a solution has become necessary for fulfilling the conflicting demands of realizing powerful security, while retaining the efficiency and flexibility of the service orientated architecture.

Considering an authentication model with a conventional service, first, as illustrated in FIG. 18A, a configuration can be considered into which a database is built, in which the various services (service A or service B) store the individual authentication processing, authorization processing, and user authentication information. With this configuration, in the case that the required authentication and authorization processing is different depending on the use of the applicable service, according to this requirement, the entire service needs to be remodeled to perform the database changes for the purpose of these authentications and to perform change processing of the access restrictions and restrictive conditions, and the burden of development cost thereof and maintenance cost is high. Further, multiple services individually maintain the authentication-authorization database, and therefore in the case of combining previously developed services and providing a new service, providing a function such as single sign-on, Federated Identity, and the like, is extremely difficult.

Also, a case will be described wherein an external device (authentication processing device) is provided which performs authentication and authorization processing externally from the multiple devices (services A and B) which provide the services as illustrated in FIG. 18B. In this case, realizing the sharing of an authentication and authorization database with multiple services with an external device is possible, but the devices which provide the various services must each implement interfacing and protocol processing with the external device performing the authentication and authorization processing. Thus, in the case that the requested authentication and authorization processing differs depending on the use of the applicable service, it becomes necessary to modify the interface and protocol according to the request thereof, or for multiple interfaces and protocols to be implemented in the individual services, and therefore similar to the former example, the burden of the development cost and the maintenance cost is high, and providing prompt corresponding service according to the user request has been extremely difficult.

Also, in the case that we focus on the realization of the use limitations and access restrictions of the service in FIG. 18B, for example, there is a conventional method wherein a preexisting, or automatically generated, token (a packet which circulates through the network) which describes the service use and access restrictions corresponding to the user information registered in the authentication database of the external device is notified to the service. Thus, by limiting one portion or all of the provided service by having the service interpreted by the token, the use limitations and access restrictions of the service have been realized. Therefore, in the case of combining multiple services to build a new service, in order to define and generate the token according to the new service, the new service needs to have a newly implemented function for interpreting and processing the new token, and the development cost and the maintenance cost have been extremely high.

This has become a hindrance for introducing the most appropriate security system at the most appropriate timing, and increased the possibility of incorrect use.

SUMMARY OF THE INVENTION

The present invention has been made considering at least one of the above-described various problems, and provides an information processing device, an information processing method, and the program thereof, which can easily realize the most appropriate security for a network service, with the network service providing processing by a service orientated architecture, without losing the efficiency and flexibility.

According to a first aspect of the present invention, an information processing method for an information processing device, which performs multiple types of authentication processing, performing authentication processing before accepting at least one or more independent services and executing the services according to the request from an external device includes: a receiving step for receiving the service requests including authentication information from the external terminal; a calling step for calling the authentication processing which performs authentication processing corresponding to the services requested from the external terminal, from first storage information which describes the authentication processing calling procedure corresponding to the aforementioned service; an output step for receiving and outputting the results of the called authentication processing; and a calling step for calling the accepted services according to the results of the authentication processing output in the aforementioned output step.

Other features of the present invention will be apparent from the following description taken in conjunction with the accompanying drawings, in which like reference symbols designate the same or similar part throughout.

BRIEF DESCRIPTION OF THE DRAWINGS

FIG. 3 is a flowchart illustrating registration processing of an authorization script according to the multi-function device shown in FIG. 1.

FIG. 5 illustrates a format example of a SOAP envelope.

FIG. 6 illustrates a description example of an authorization script.

FIG. 7 illustrates an example of modifying as to the SOAP envelope in FIG. 5.

FIG. 8 illustrates a first example of a mapping script.

FIG. 11 illustrates a fourth example of the mapping script.

FIG. 12 illustrates a fifth example of the mapping script.

FIG. 13 illustrates relationships to the print service of the authentication and authorization services thereof according to the security level.

FIG. 14 illustrates an example of a network image processing system including an information processing device according to another embodiment.

FIG. 16 is a model diagram illustrating a function model example of an information processing device according to the first embodiment.

FIG. 17 illustrates a schematic configuration of a network image processing system including a multi-function device for networking according to a second embodiment of the present invention.

FIG. 18A illustrates a configuration example of a conventional individual service (service A or service B), wherein the various authentication processes, authorization processes, and databases storing user authentication information are built in.

DESCRIPTION OF THE EMBODIMENTS

Figure 1:
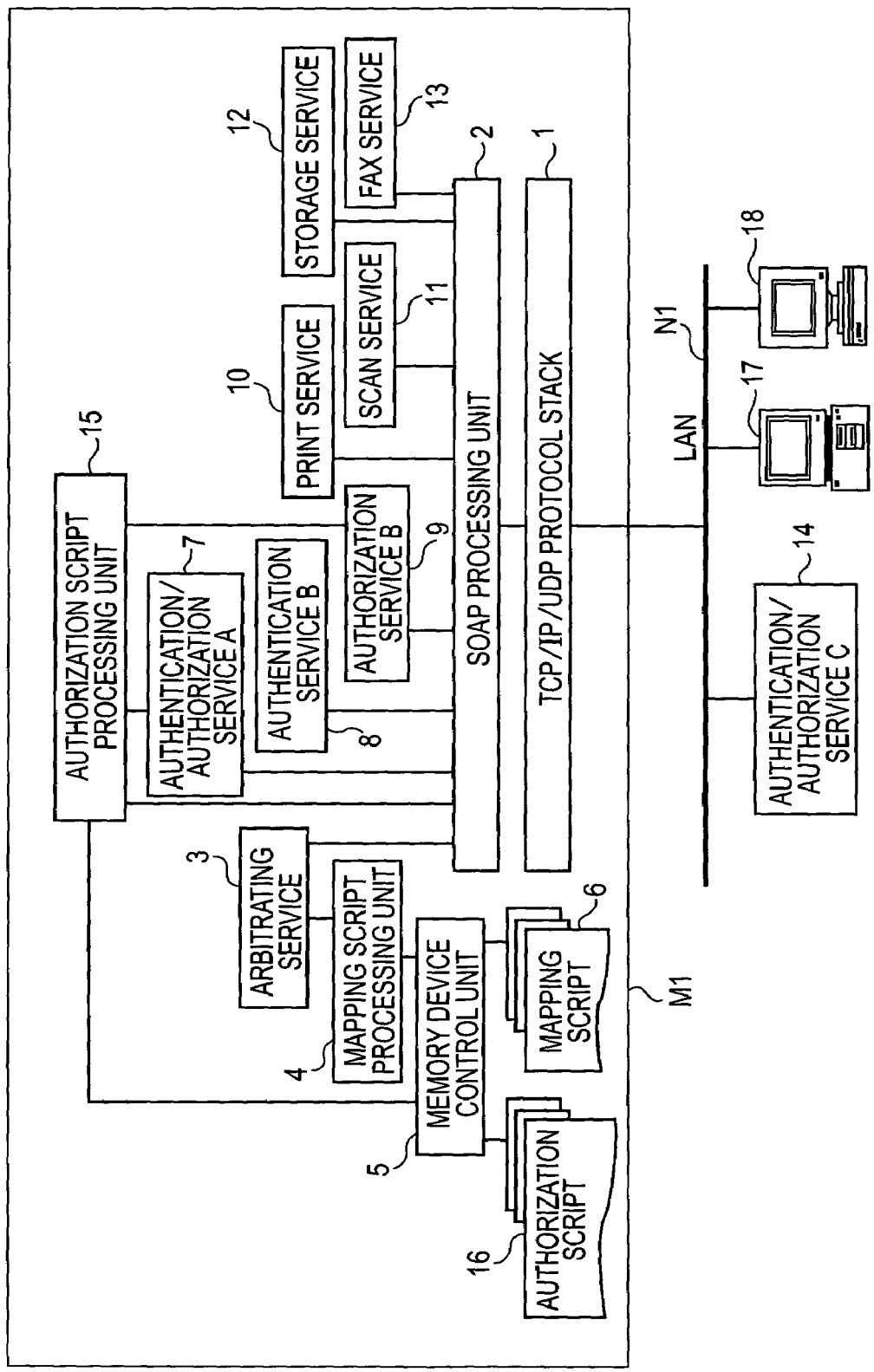
FIG. 1 is a block diagram illustrating a function configuration of a multi-function device according to an embodiment of the present invention.

Exemplary embodiments of the present invention are described below, referencing the drawings.

First Embodiment

First, a computer function model will be described which implements Web services which realize the service orientated architecture (SOA) model, as an information processing device according to the first embodiment of the present invention. FIG. 16 is a model diagram illustrating a function model example of an information processing device 170 according to the first embodiment.

In FIG. 16, an entrance unit 171 receives a request for a service provided by the information processing device 170 from, for example, a client (terminal). The entrance unit 171 communicates the received service name from the requester and the authentication-related information to an arbitrator 172. The arbitrator 172 references a mapping table 173, and acquires the information relevant to the authorization and authorization processing service (hereafter called service authentication information) as to the requested service. The arbitrator 172 communicates the authentication information received from the entrance unit 171 to the corresponding authentication-authorization processing service unit 174, based on the acquired service authentication information.

The authentication-authorization processing service unit 174 performs authentication processing based on the authentication information communicated from the arbitrator 172. Also, the authentication-authorization processing service unit 174 references an authorization information table 175, and modifies the content of the request as necessary, based on the authorization/access restriction information described in this authorization information table 175. The results of the authentication and authorization process of the authentication-authorization processing service unit 174 are replied to the arbitrator 172.

The arbitrator 172 communicates the possibility of service execution based on these processing results, or the access restriction information, to the entrance unit 171. The entrance unit 171 calls the requested service to a service unit 176 based on the results returned from the arbitrator 172, or communicates whether the service execution is denied by the client which is the request generator.

As described above, the information processing device 170 of the present embodiment realizes a loose coupling of a service and the authentication and authorization processing services as to the service thereof, by providing a control flow for the purpose of authentication-authorization processing that is independent of the service providing processing flow. Also, in the event of calling the service, the content of this request is modified in advance by the authentication-authorization processing service unit 174, based on the authorization provided by the generator of the request and the access restrictions, and by executing the received request only, the processing can be performed wherein authorization and access restrictions have already been performed, and loose coupling of authorization and access restriction services as to the performing of services can be realized.

The features of the above-described information processing device 170, the arbitrator 172, the service unit 176, and the information table (mapping table 173) implemented with the information relevant to the authentication-authorization processing service correspond to the service for the purpose of performing authentication-authorization processing as to the service provided by the service unit 176. Also, a feature of the information processing device 170, relating to the authorization processing and the access restriction processing, is the authentication-authorization processing service unit 174 which performs these processes referencing the information table relevant to the authorization and access restrictions (authorization information table 175), wherein a function is implemented which modifies the request from the client according to the authorization/access restriction information described in this information table 175.

Accordingly, with the information processing device 170 having the above-described characteristics, by changing the description content of the mapping table 173, the same services can be subjected to the correspondence to other types of authentication-authorization services. Also, with the information processing device 170, even in the event that a new service which functions by combining multiple services is added to the service unit 176, this new service can be subjected to new authentication-authorization services in the mapping table 173. Also, with the information processing device 170, by changing the description content of the authorization information table 175, different authorization and access restrictions can be performed depending on the usage case as to the same requester performing the request for the same service, and security requirements in the service orientated architecture can be handled flexibly.

Second Embodiment

Next, the second embodiment will be described in the case of realizing the feature processes of the information processing device 170 according to the above-described first embodiment in a multi-function device. In other words, an information processing device according to the second embodiment of the present invention will be described using a multi-function device having a printing function or photocopy function as an example. Specifically, a network image processing system including a multi-function device connected to a network (multi-function device for networking) will be described.

FIG. 17 is a diagram illustrating a schematic configuration of a network image processing system including a multi-function device M1 for networking, which is the second embodiment of the present invention. In FIG. 17, a multi-function device (MFP) M1 is a multi-function device for networking, which provides a printing service, a scanning service, a storage service, a FAX service and the like to computer terminals (terminal C1 and terminal C2) capable of being connected via a network N1. C1, C2 . . . are computer terminals, and can use the above-mentioned services provided by the multi-function device M1 via the network N1.

The multi-function device M1 according to the present embodiment has a function for performing security processing for user authentication, access restrictions, and the like, using XML (extensible Markup Language) which is a structured language. Also, the multi-function device M1 realizes the Web services by the service orientated architecture. Also, the hardware configuration of the multi-function device M1 includes, for example, a communication device 100, a central processing unit (CPU) 101, memory 102, a hard disk drive (HDD) 103, a printer 104, a scanner 105, an image processing device 106 and the like. The communication device 100 communicates with the terminals C1, C2, and so on via the network N1. The CPU 101 is a computer for executing the program for realizing the various functions of the multi-function device M1. Specifically, the CPU 101 reads out the programs (application programs and so forth) for realizing the various functions from the HDD 103, and executes the read programs using the memory 102 as a work region.

Next, the function configuration which the multi-function device M1 according to the present embodiment has will be described. FIG. 1 is a block diagram illustrating the function configuration of the multi-function device M1 according to the present embodiment. The multi-function device M1 has a protocol stack processing unit 1 for stacking the TCP/IP/UDP protocol as a communication function, and on the upper level thereof has a SOAP (Simple Object Access Protocol) processing unit 2, and on the upper level thereof has an arbitrating service unit 3, a mapping script processing unit 4, an authentication-authorization service A 7, an authentication service B 8, an authorization service B 9, an authorization script processing unit 15, a printing service 10, a scanning service 11, a storage service 12, and a FAX service 13, and provides these services to a client PC 17, via the network N1.

An authentication-authorization service C 14 is in the form of an independent logic unit, which realizes the authentication-authorization service function, via the network N1. An example is a logical unit independently running on a PC serving as a server. Now, with the present embodiment, the authentication-authorization service C 14 is provided on the external portion of the multi-function device M1, but the authentication-authorization service C 14 can also be provided on the upper level of the SOAP processing unit 2, as is similar to the authentication-authorization service A. Client PC 17 uses the services of the multi-function device M1, and PC 18 is an administrative terminal PC which performs settings and so forth of the multi-function device M1. The network N1 is a communication network, such as a Local Area Network (LAN), for example.

As to the multi-function device M1, stopping a function, deleting a service, reinstalling a service, or newly installing a service of one portion or all of the above-mentioned services can be performed from an external device (for example, the administrative terminal PC 18). In this case, a new service includes a service which provides a new function by combining multiple services already installed, for example.

The SOAP processing unit 2 has the functionality to send the received SOAP envelope to the arbitrating service unit 3, generate a SOAP response based on the processing results returned from the arbitrating service unit 3, and to reply to the client PC 17 which issued the request. Also, the SOAP processing unit 2 has the functionality to transmit the description content of the SOAP body as to the applicable service, based on the processing results returned from the arbitrating service unit 3, and to reply to the client PC 17 which issued the request.

The arbitrating service unit 3 has the functionality to analyze the description content of the SOAP header unit transmitted from the SOAP processing unit 2, and to acquire the information related to the service for which execution is requested. Also, the arbitrating service unit 3 has the functionality to acquire the information (service authentication information) relating to the authentication-authorization service corresponding to requested service from the mapping script 6 registered on the memory managed by the memory device control unit 5, via the mapping script processing unit 4. Also, the arbitrating service 3 has the functionality to transmit the authentication information described in the SOAP header as to the authentication-authorization service specified based on the service authentication information acquired by the mapping script 6. Furthermore, the arbitrating service unit 3 has a function for generating a response based on the processing results communicated from the authentication-authorization service, and communicating to the SOAP processing unit 2.

As illustrated in FIG. 1, the multi-function device M1 has an authentication-authorization service A 7, an authentication service B 8, and an authorization service B 9 built in as authentication-authorization services which are services that realize the authentication and authorization functions. These various authentication and authorization services have the functionality to process the authentication information sent from the arbitrating service unit 3, and respond to the arbitrating service unit 3 with the processing results thereof. Further, of these various authentication and authorization services, the authentication-authorization service A 7 and the authorization service B 9, which have an authorization function, have the functionality to acquire the information relating to the access restrictions as to the requested service from the authorization script 16 which is registered in the memory managed by the memory device control unit 5, via the authorization script processing unit 15.

Also, the authorization script processing unit 15 has the functionality to register and delete the authorization script 16, and a validation specification function of the authorization script 16. The authorization script processing unit 15 also has the functionality to receive the service execution request information described in the SOAP body from the authentication-authorization service A 7 and the authorization service B 9, and to modify the response (execution request information) based on the access control information acquired from the authorization script 16. The response modified by the authorization script processing unit 15 is received by the authentication-authorization service A 7 and the authorization service B 9, and notification is sent to the arbitrating service unit 3. Now, with the present embodiment, the authorization script processing unit 15 performs the processing to modify the response (execution request information), but does not need to be limited to this, and the authentication-authorization services such as the authentication-authorization service A 7 and the authorization service B 9 can perform the processing to modify the response (execution request information).

As illustrated in FIG. 1, the multi-function device M1 implements a printing service 10, a scanning service 11, a storage service 12, and a FAX service 13 as functions for providing services. These services are Web services corresponding to XML-SOAP, and by accessing these services via the network N1 from an external device (administrative terminal PC-18) managed by an administrator, one portion of all of the functions of the services can be stopped, restarted, deleted, or reinstalled, and further, a new service can similarly be added, started, stopped, or deleted.

The mapping script processing unit 4 to be the lower level of the arbitrating service unit 3 has the functionality to access the memory via the memory device control unit 5. The memory device control unit 5 controls the data writing to and reading from the memory stored in the mapping script 6 which describes the information relating to a service or the authentication-authorization service as to the service thereof (service authentication information), or the processing sequence, according to the controls from the mapping script processing unit 4.

Also, the above-mentioned mapping script 6 can delete, reinstall, and perform renewal processing from an external device (administrative terminal PC-18) managed by an administrator. Thus, according to the description content of this mapping script 6, the same services can be subjected to correspondence to other authentication-authorization service. Also, security requirements can be flexibly handled as to a new service function by combining multiple services, such as correspondence to new authentication-authorization services.

The authorization script processing unit 15 which is on the lower level of the authentication-authorization service A 7 and the authorization service B 9 has the functionality to access the memory via the memory device control unit 5. The memory device control unit 5 controls the data writing to and reading from the memory stored in the authorization script 16 describing the information relating to the authorization and the access restrictions (authorization and access restriction information), and the processing sequences, according to the control from the authentication-authorization service A 7 and the authorization service B 9.

With the present embodiment, the mapping script 6 describing the information relating to the authentication-authorization service (service authentication information) subjected to correspondence to the services which are operating on the multi-function device M1, and the authorization script 16 describing the authorization and access restriction information, are registered in advance on the memory of the multi-function device M1.

Now, in the case that this registration processing is not executed, and this mapping script 6 is not on the memory of the multi-function device M1, in the case of the present embodiment, none of the services in operation on the multi-function device M1 can be executed. Similarly, in the case that this authorization script 16 is not on the memory of the multi-function device M1, the services subjected to correspondence to the authorization service which references this authorization script 16 cannot be executed.

The mapping script 6 is stored in the memory controlled by the memory device control unit 5, by the system administrator performing registration processing via the network as to the multi-function device M1. The system administrator sends the mapping script 6 describing the authentication-authorization service subjected to correspondence to the various services implemented in the multi-function device M1 as to the multi-function device M1 from the administrative terminal PC 18 managed by the system administrator.

With the present embodiment, an XML-SOAP Remote Procedure Call (RPC) illustrated below relating to the registration and deleting of the mapping script 6 is provided. Thus, the mapping script processing unit 4 realizes the registration and deleting of the mapping script 6 and the validation specification function of the mapping script 6. The SOAP function for performing registration and deleting is described below.

UploadScript (scriptName, account, password) is the SOAP function for the purpose of sending and registering the mapping script 6 as to the multi-function device M1. With the multi-function device M1 of the present embodiment, multiple mapping scripts 6 can be registered, and therefore the scriptName is used as identification data thereof. With the multi-function device M1 of the present embodiment, an ASCII character string of up to 32 characters can be used. Now, the account and password both use an ASCII character string of up to 32 characters. This information has already been registered to the multi-function device M1 of the present embodiment, and this information is stored on the memory managed by the memory device control unit 5, and is information that can only be known to the system administrator.

The mapping script 6 which is XML data is sent in the format of an attached file of the SOAP envelope describing this SOAP function.

DeleteScript (scriptName, account, password) is the SOAP function for the purpose of deleting the mapping script 6 which has already been registered to the multi-function device M1. Only the system administrator that knows the account and password can delete the mapping script 6 which is registered on the memory of the multi-function device M1. With the present embodiment, multiple mapping scripts 6 can be registered, and therefore the mapping script 6 to be deleted is specified by the scriptName.

EnableScript (scriptName, account, password) is the SOAP function for the purpose of validating the mapping script 6 specified by the scriptName as to the multiple mapping scripts 6 which have been registered to the multi-function device M1. With this function also, only the system administrator that knows the account and password can specify and validate the mapping script 6 which is registered on the memory of the multi-function device M1.

Figure 2:
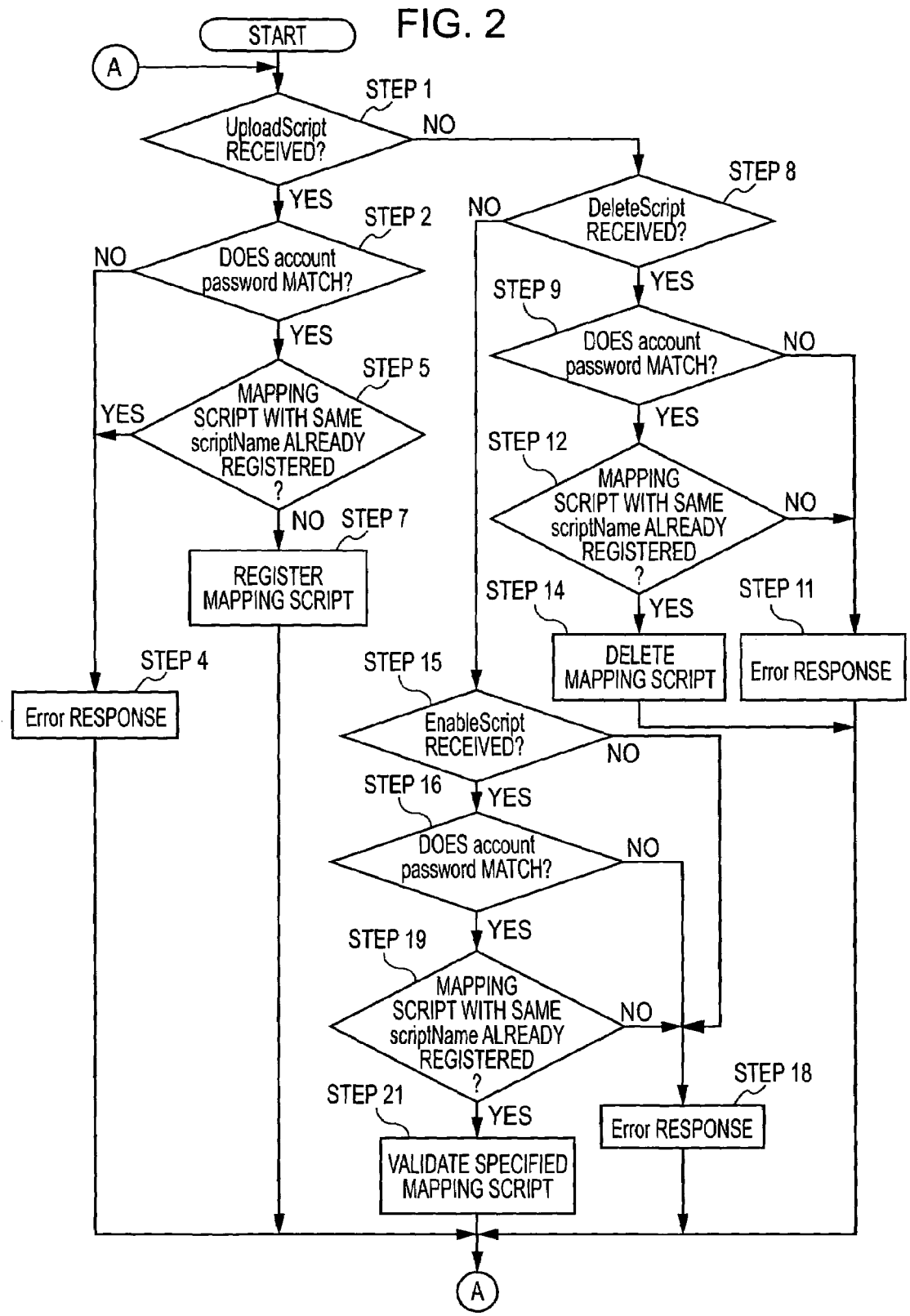
FIG. 2 is a flowchart illustrating registration processing of a mapping script according to the multi-function device shown in FIG. 1.

Next, the registration processing of the mapping script 6 will be described. FIG. 2 is a flowchart illustrating the registration processing of the mapping script 6 according to the multi-function device M1 of the present embodiment. Now, as a premise to the processing in FIG. 2, the administrative terminal PC 18 which is an external device sends the SOAP request and the mapping script 6 to the multi-function device M1 which has the mapping script processing unit 4.

As illustrated in FIG. 2, first, the mapping script processing unit 4 which includes the arbitrating service unit 3 determines whether or not the UploadScript which is the SOAP request is received via the SOAP processing unit 2 (step 1). Here, in the case that the UploadScript which is the SOAP request is determined to have been received, the mapping script processing unit 4 determines whether or not the information (hereafter called account information) stored in the memory via the memory device control unit 5 matches, in order to verify the content of the account and password which are arguments (step 2).

In the case that the account information is determined not to match (no in step 2), the mapping script processing unit 4 replies with an error response message via the SOAP processing unit 2 (step 4). Processing then returns to step 1. In the case that the account information is determined to match (yes in step 2), the mapping script processing unit 4 determines whether or not the mapping script having the same scriptName is already registered (step 5).

In the case that registration is determined to have already been done (yes in step 5), the mapping script processing unit 4 replies with an error response message via the SOAP processing unit 2 (step 4), and returns to step 1. In this case, as long as the administrator does not delete the mapping script 6 already registered, using the DeleteScript request, a mapping script having the same scriptName cannot be registered.

In the case that it is determined there is no registration already done (no in step 5), the mapping script processing unit 4 stores the mapping script sent in the format of an attached file of this request in the memory via the memory device control unit 5 (step 7). Processing then returns to step 1.

In the case that the UploadScript which is the SOAP request is determined not to have been received (no in step 1), the mapping script processing unit 4 determines whether or not the DeleteScript which is the SOAP request is received via the SOAP processing unit 2 (step 8). Here, in the case that the DeleteScript which is the SOAP request is determined to have been received (yes in step 8), the mapping script processing unit 4 determines whether or not the information (account information) stored in the memory via the memory device control unit 5 matches, in order to verify the content of the account and password which are arguments (step 9).

In the case that the account information is determined not to match (no in step 9), the mapping script processing unit 4 replies with an error response message via the SOAP processing unit 2 (step 11). Processing then returns to step 1. In the case that the account information is determined to match (yes in step 9), the mapping script processing unit 4 determines whether or not the mapping script 6 having the same scriptName is already registered (step 12).

In the case that the mapping script 6 having the specified scriptName is not stored in the memory, i.e., in the case that registration is not done, (no in step 12), the mapping script processing unit 4 replies with an error response message via the SOAP processing unit 2 (step 11) and processing returns to step 1. Also, in the case that the mapping script 6 having the specified scriptName is stored in the memory, i.e., in the case that registration has been done (yes in step 12), the mapping script processing unit 4 deletes the mapping script stored in the memory via the memory device control unit 5 (step 14). Processing then returns to step 1.

In the case that the DeleteScript which is the SOAP request is determined not to have been received (no in step 8), the mapping script processing unit 4 determines whether or not the EnableScript which is the SOAP request is received via the SOAP processing unit 2 (step 15). Here, in the case that the EnableScript which is the SOAP request is determined not to have been received (no in step 15), the mapping script processing unit 4 replies with an error response message via the SOAP processing unit 2 (step 18) and processing returns to step 1. In the case that the EnableScript which is the SOAP request is determined to have been received (yes in step 15), the mapping script processing unit 4 determines whether or not the information (account information) stored in the memory via the memory device control unit 5 matches, in order to verify the content of the account and password which are arguments (step 16).

In the case that the account information is determined not to match (no in step 16), the mapping script processing unit 4 replies with an error response message via the SOAP processing unit 2 (step 18) and processing returns to step 1. In the case that the account information is determined to match (yes in step 16), the mapping script processing unit 4 determines whether or not the mapping script having the specified scriptName is already registered (step 19).

In the case that the mapping script having the specified scriptName is not stored in the memory, i.e., in the case that registration is not done, (no in step 19), the mapping script processing unit 4 replies with an error response message via the SOAP processing unit 2 (step 18) and processing returns to step 1. In the case that the mapping script having the specified scriptName is stored in the memory, i.e., in the case that registration has been done (yes in step 19), the mapping script processing unit 4 validates the mapping script 6 having the specified scriptName (step 21), and hereafter, the arbitrating service unit 3 references this mapping script 6. Processing then returns to step 1.

By the above-illustrated processing, the mapping script registration processing and validation processing according to the application (service) from the external device (administrative terminal PC 18) to the multi-function device M1 is completed. The system administrator can repeatedly execute registration, deletion, and validation processing for the mapping script of the applicable application (service), according to use and necessity.

Similarly, with the authorization script 16, by the system administrator performing registration processing via the network N1 as to the multi-function device M1, the memory device control unit 5 is stored on the memory to be controlled. The system administrator sends the authorized script 16, which is subjected to correspondence to the various authorization services implemented on the multi-function device and on which the authorization and access restriction information is described, to the multi-function device M1 from the administrative terminal PC 18 which is managed by the system administrator.

With the present embodiment, an XML-SOAP Remote Procedure Call (RPC) illustrated below is provided, relating to the registration and deletion of the authorization script 16. Thus, the authorization script processing unit 15 realizes the registration and deletion of the authorization script 16 and the validation specification function of the authorization script 16. The SOAP function is described below.

UploadAuthScript (scriptName, authName, account, password) is the SOAP function for the purpose of sending and registering the authorization script 16 as to the multi-function device M1. With the present embodiment, multiple authorization scripts 16 can be registered, and therefore the scriptName is used as identification data thereof. With the present embodiment, an ASCII character string of up to 32 characters can be used. Also, the authorization service which references this authorization script 16 is specified by the authName. Now, the account and password both use an ASCII character string of up to 32 characters. This information has already been registered to the multi-function device M1 of the present embodiment, and this information is stored in the memory managed by the memory device control unit, and is information that can only be known to the system administrator. The authorization script 16 which is XML data is sent in the format of an attached file of the SOAP envelope describing this SOAP function.

DeleteAuthScript (scriptName, authName, account, password) is the SOAP function for the purpose of deleting the authorization script 16 which has already been registered to the multi-function device M1. Only the system administrator that knows the account and password deletes the authorization script 16 which is registered in the memory of the multi-function device M1. With the present embodiment, multiple authorization scripts 16 can be registered, and therefore the authorization script 16 to be deleted is specified by the scriptName and the authName.

EnableAuthScript (scriptName, authName, account, password) is the SOAP function for the purpose of validating the authorization script 16 specified by the scriptName and authName as to the multiple authorization scripts 16 which have been registered to the multi-function device M1. Only the system administrator that knows the account and password can specify and validate the authorization script 16 which is registered in the memory of the multi-function device M1.

Next, the registration processing of the authorization script 16 will be described. FIG. 3 is a flowchart illustrating the registration processing of the authorization script 16 according to the multi-function device M1 of the present embodiment. Now, as a premise to the processing in FIG. 3, the administrative terminal PC 18 which is an external device sends the SOAP request and the authorization script 16 to the multi-function device M1 which has the authorization script processing unit 15.

As illustrated in FIG. 3, first, the authorization script processing unit 15 which includes the arbitrating service unit 3 determines whether or not the UploadAuthScript which is the SOAP request is received via the SOAP processing unit 2 (step 31). Here, in the case that the UploadAuthScript which is the SOAP request is determined to have been received (yes in step 31), the authorization script processing unit 15 determines whether or not the information (hereafter called account information) stored in the memory via the memory device control unit 5 matches, in order to verify the content of the account and password which are arguments (step 32).

In the case that the account information is determined not to match (no in step 32), the authorization script processing unit 15 replies with an error response message via the SOAP processing unit 2 (step 34) and processing returns to step 31. In the case that the account information is determined to match (yes in step 32), the authorization script processing unit 15 determines whether or not the authorization script 16 having the same scriptName and authName is already registered (step 35).

In the case that registration is determined to have already been done (yes in step 35), the authorization script processing unit 15 replies with an error response message via the SOAP processing unit 2 (step 34), and returns to step 31. In this case, as long as the administrator does not delete the authorization script 16 already registered, using the DeleteAuthScript request, an authorization script 16 having the same scriptName and authName cannot be registered.

In the case that it is determined there is no authorization script already registered (no in step 35), the authorization script processing unit 15 determines whether or not the authorization service specified by the AuthName is in an operating state on the multi-function device M1 (step 37). Here, in the case that the specified authorization service is not in an operating state on the multi-function device M1 (no in step 37), the authorization script processing unit 15 replies with an error response message via the SOAP processing unit 2 (step 34), and returns to step 31.

In the case that the specified authorization service is in an operating state on the multi-function device M1 (yes in step 37), the authorization script processing unit 15 stores the authorization script 16 sent in the format of an attached file of this request in the memory via the memory device control unit 5 (step 39). Processing then returns to step 31.

In the case that the UploadAuthScript which is the SOAP request is determined not to have been received (no in step 31), the authorization script processing unit 15 determines whether or not the DeleteAuthScript which is the SOAP request is received via the SOAP processing unit 2 (step 40). Here, in the case that the DeleteAuthScript which is the SOAP request is determined to have been received (yes in step 40), the authorization script processing unit 15 determines whether or not the information (account information) stored in the memory via the memory device control unit 5 matches, in order to verify the content of the account and password which are arguments (step 41).

In the case that the account information is determined not to match (no in step 41), the authorization script processing unit 15 replies with an error response message via the SOAP processing unit 2 (step 43) and processing returns to step 31. In the case that the account information is determined to match (yes in step 41), the authorization script processing unit 15 determines whether or not the authorization script 16 having the same scriptName and authName is already registered (step 44).

In the case that the authorization script 16 having the specified scriptName, and that further corresponds to the specified AuthName, is not stored in the memory, i.e., in the case that registration is not done (no in step 44), the authorization script processing unit 15 replies with an error response message via the SOAP processing unit 2 (step 43) and processing returns to step 31. In the case that the authorization script 16 having the specified scriptName, and that further corresponds to the specified AuthName, is stored in the memory, i.e., in the case that registration has been done (yes in step 44), the authorization script processing unit 15 deletes the authorization script 16 stored in the memory via the memory device control unit 5 (step 46) and processing returns to step 31.

In the case that the DeleteAuthScript which is the SOAP request is determined not to have been received (no in step 40), the authorization script processing unit 15 determines whether or not the EnableAuthScript which is the SOAP request is received via the SOAP processing unit 2 (step 47). Here, in the case that the EnableAuthScript which is the SOAP request is determined to have been received, the authorization script processing unit 15 determines whether or not the information (account information) stored in the memory via the memory device control unit 5 matches, in order to verify the content of the account and password which are arguments (step 48).

In the case that the account information is determined not to match (no in step 48), the authorization script processing unit 15 replies with an error response message via the SOAP processing unit 2 (step 50) and processing returns to step 31. In the case that the account information is determined to match (yes in step 48), the authorization script processing unit 15 determines whether or not the authorization script 16 having the specified scriptName and AuthName is already registered (step 51).

In the case that the authorization script 16 having the specified scriptName and AuthName is not stored on the memory, i.e., in the case that registration is not done (no in step 51), the authorization script processing unit 15 replies with an error response message via the SOAP processing unit 2 (step 50) and processing returns to step 31.

In the case that the authorization script 16 having the specified scriptName and AuthName is stored on the memory, i.e., in the case that registration has been done (yes in step 51), the authorization script processing unit 15 validates the authorization script 16 having the specified scriptName (step 53), and hereafter, the various authorization services (with the present embodiment, the authentication-authorization service A 7 and the authorization service B 9) reference this authorization script 16. Processing then returns to step 31.

By the above-illustrated processing, the authorization script 16 registration processing and validation processing according to the application from the external device (administrative terminal PC 18) to the multi-function device M1 is completed. The system administrator can repeatedly execute registration, deletion, and validation processing for the authorization script 16 of the applicable application, according to use and necessity.

When the registration processing of the mapping script 6 and the authorization script 16 is completed, the various services of the multi-function device M1 of the present embodiment can operate.

Figure 4A:
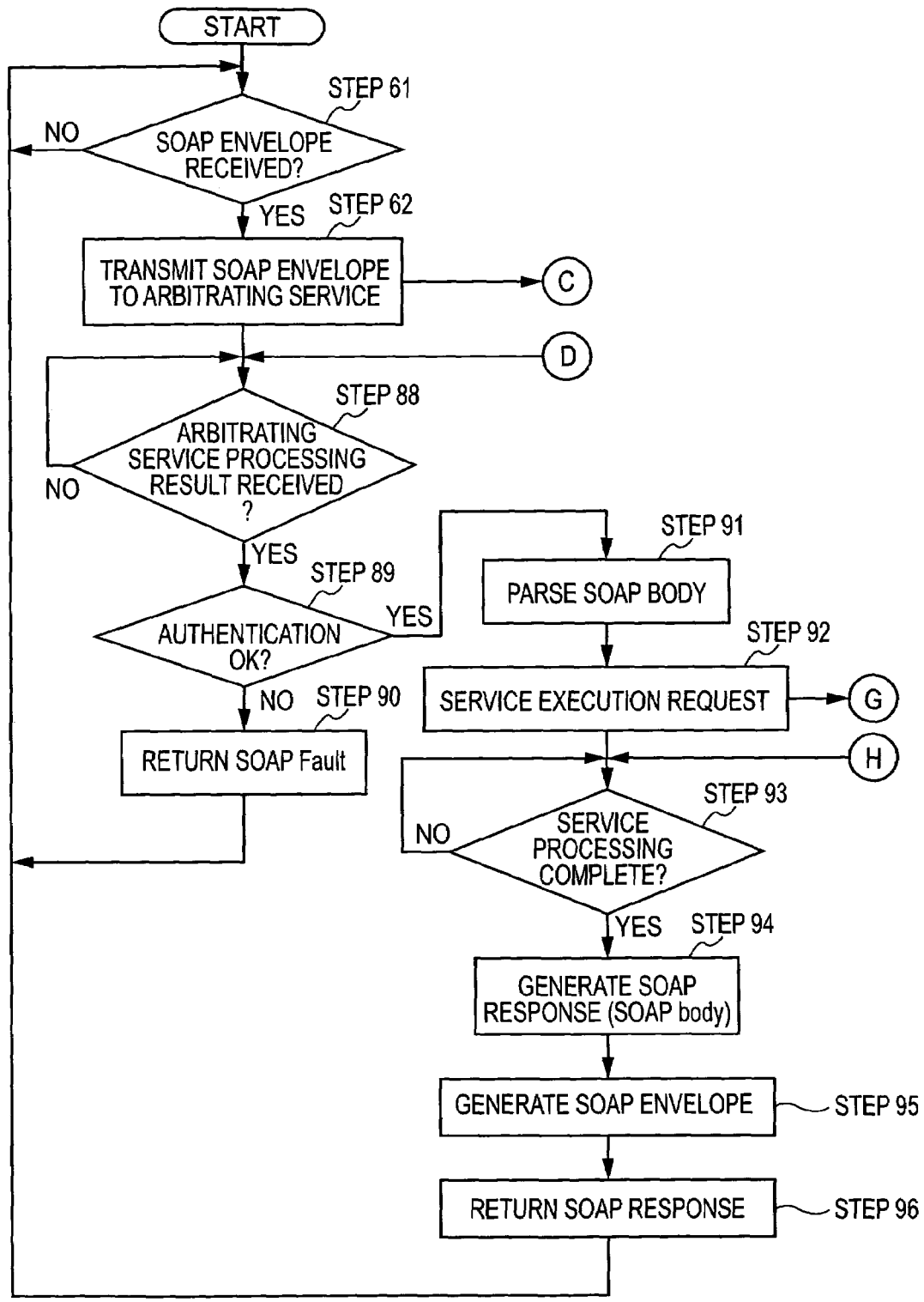
FIG. 4A is a flowchart illustrating an exemplary control flow of a SOAP processing unit according to FIG. 1.

Next, the control flow of the processing which performs the authentication and authorization processing, which is a feature of the multi-function device M1 of the present embodiment, will be described in detail. Now, the correlation of the function block between the information processing device 170 of the first embodiment illustrated in FIG. 16 and the multi-function device M1 of the present embodiment illustrated FIG. 1 will be described. The receiving unit 171 in FIG. 16 equates to the SOAP processing unit 2 in FIG. 1 with the present embodiment, and FIG. 4A is a flowchart illustrating the control flow thereof. Also, the arbitrating processing unit 172 in FIG. 16 equates to the arbitrating service unit 3 in FIG. 1 with the present embodiment, and FIG. 4B is a flowchart to illustrate the control flow thereof.

Also, the mapping table 173 in FIG. 16 equates to the mapping script 6 in FIG. 1 with the present embodiment. Also, the authentication-authorization service unit 174 in FIG. 16 equates to the authentication-authorization service A 7, the authentication service B 8, and the authorization service B 9 (summarized as authentication-authorization service) in FIG. 1 with the present embodiment, and FIG. 4C is a flowchart to illustrate the control flow thereof. Also, the authorization information table 175 in FIG. 16 equates to the authorization script 16 in FIG. 1. Also, the service unit 176 in FIG. 16 equates to the various services illustrated in FIG. 1 with the present embodiment which are the printing service 10, the scanning service 11, the storage service 12, and FAX service 13, and FIG. 4D is a flowchart to illustrate the control flow thereof.

Below, the flow of control will be described, according to the flowcharts illustrated in FIG. 4A through FIG. 4D. First, as illustrated in FIG. 4A, while the multi-function device M1 is operating, the SOAP processing unit 2 constantly monitors the receipt of the SOAP request sent from the client PC 17, via the TCP/IP/UDP protocol stack (step 61), and when the receipt of the SOAP request is confirmed (step 62), the received SOAP envelope is sent to the arbitrating service unit 3. Subsequently, the processing of the arbitrating service unit 3 will be described with reference to FIG. 4B, and the other processing of the SOAP processing unit 2 in FIG. 4-1 will be described later.

Figure 4B:
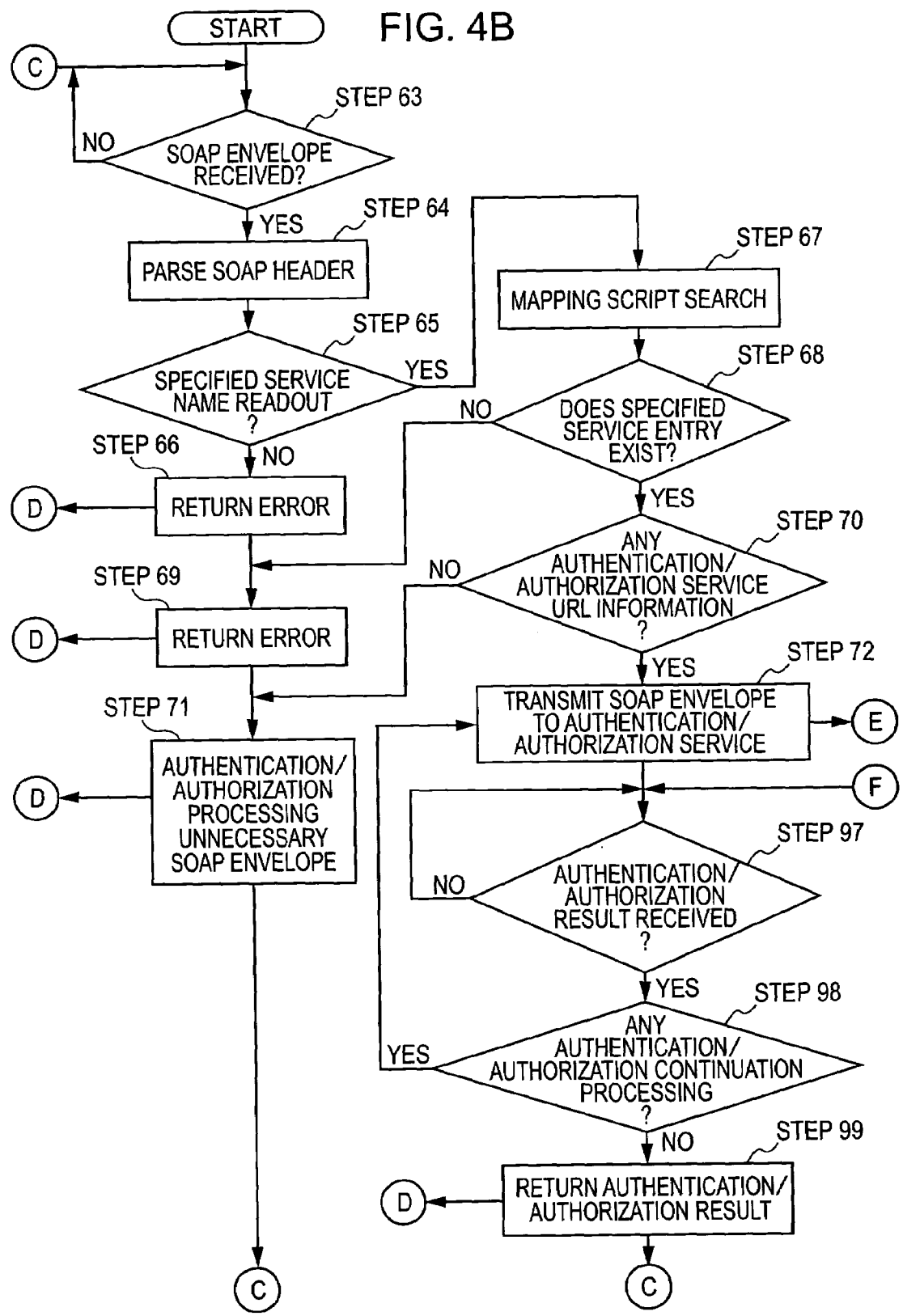
FIG. 4B is a flowchart illustrating an exemplary control flow of an arbitrating service unit according to FIG. 1.
Figure 4C:
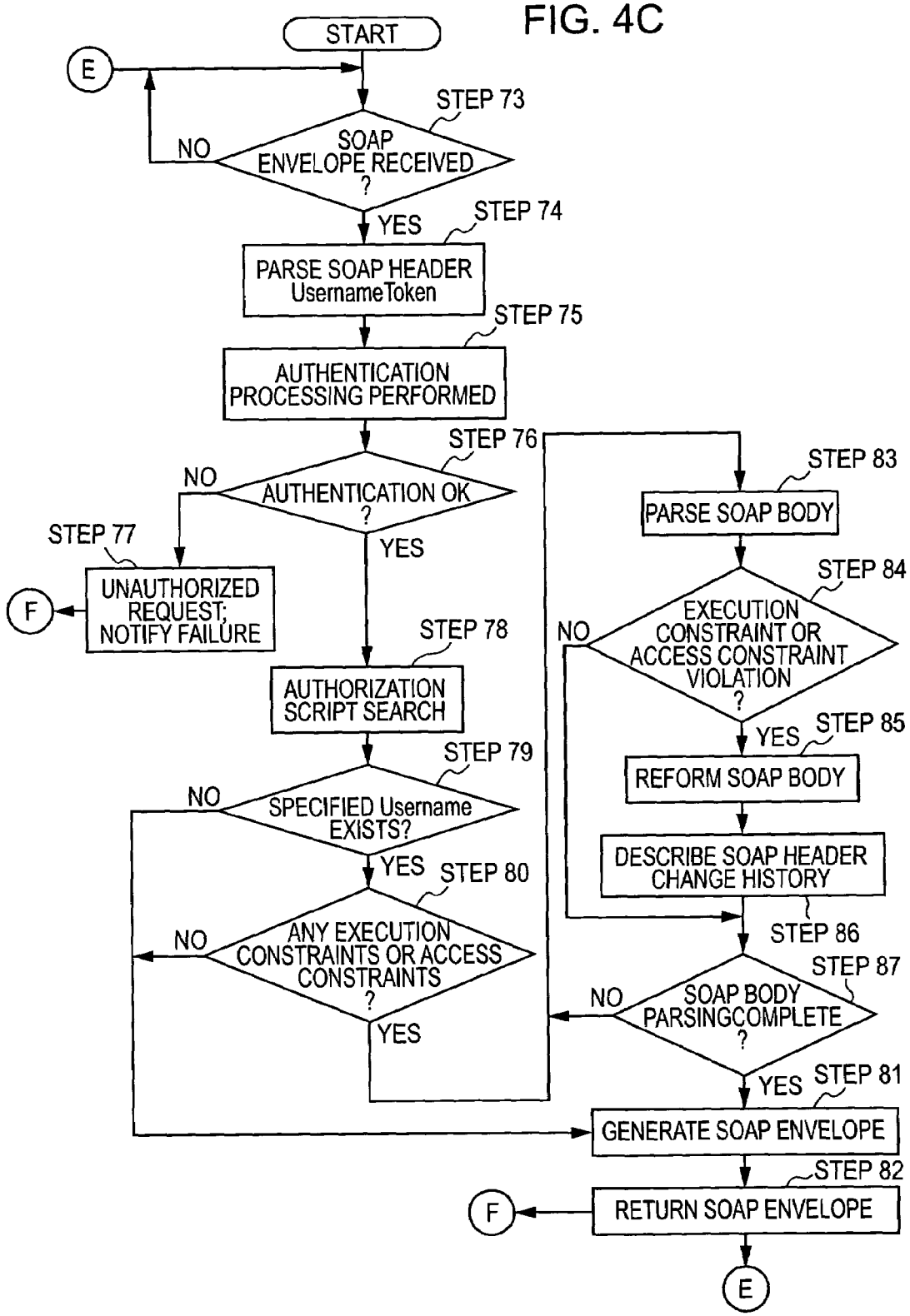
FIG. 4C is a flowchart illustrating an exemplary control flow of the authentication-authorization service according to FIG. 1.
Figure 4D:
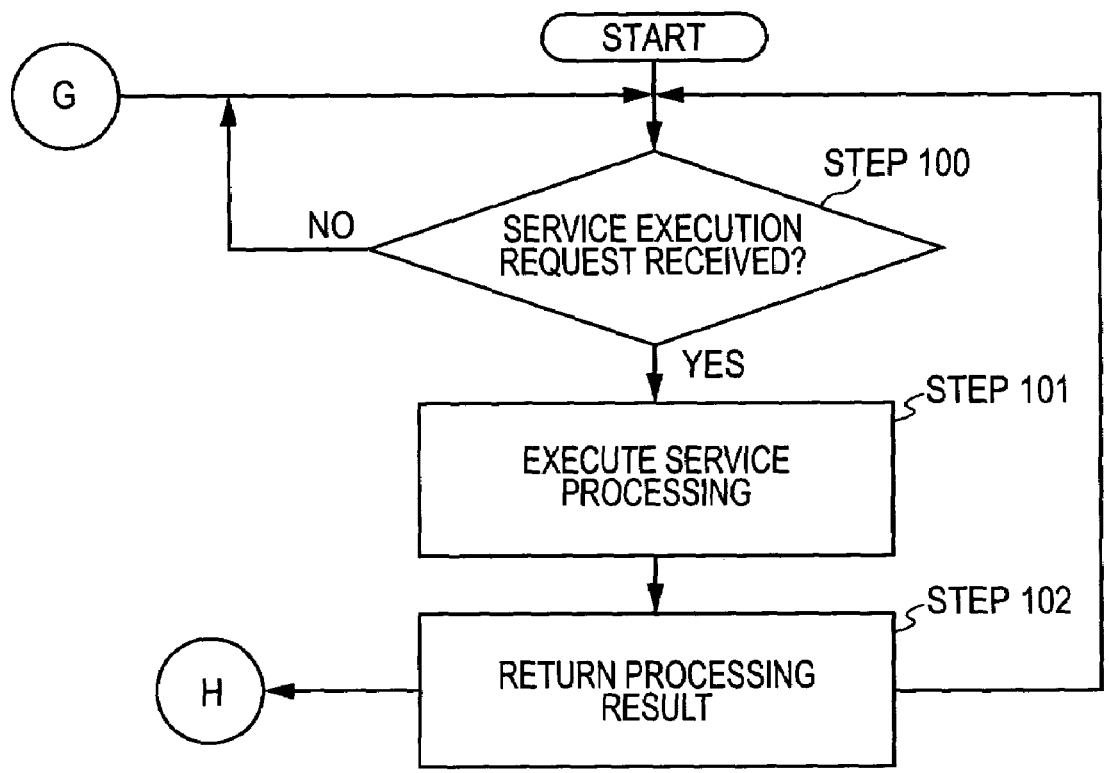
FIG. 4D is a flowchart illustrating an exemplary control flow of the various services illustrated in FIG. 1.

As illustrated in FIG. 4B, the arbitrating service unit 3 constantly monitors the receipt of SOAP envelopes from the SOAP processing unit 2 (step 63). When a SOAP envelope is received from the SOAP processing unit 2 (yes in step 63), the arbitrating service unit 3 parses (analyzes) the description content of the SOAP header (step 64).

FIG. 5 illustrates a format example of the SOAP envelope. The SOAP envelope in FIG. 5 can be largely divided into a SOAP header portion and a SOAP body portion. As illustrated in FIG. 5, the service name to be requested is described in the SOAP header as the contents of an <ACTION> tag 51, based on the WS-Addressing specifications. Also, the authentication information is described as the contents of a <UsernameToken> tag 52, based on the WS-Security UsernameToken Profile 1.0 specifications which are established by the standards body OASIS. (See URL: http://schemas.xml-soap.org/ws/2003/03/addressing/)

The arbitrating service unit 3 in step 64 parses a SOAP header such as that illustrated in FIG. 5, and first, checks the existence of the <ACTION> tag 51 and the content thereof (step 65). In the case that there is no <ACTION> tag 51, or in the case that the <ACTION> tag 51 exists but the content thereof is empty (no in step 65), in other words in the case of an empty tag, the arbitrating service unit 3 notifies the error as an incorrect request to the SOAP processing unit 2 (step 66). Processing then proceeds to step 88 (FIG. 4A). In the case that determination is made that the content of the <ACTION> tag 51 exists (yes in step 65), the arbitrating service unit 3 reads out the content of the mapping script 6, which has been validated previously by the EnableScript, via the memory device control unit 5 (step 67), and searches whether or not the service described as content of the <ACTION> tag 51 is described on this mapping script 6 (step 68).

As the result of the search, in the case that the registration applicable to the service described in the <ACTION> tag 51 is not found (no in step 68), the arbitrating service unit 3 notifies the error as an incorrect request to the SOAP processing unit 2 (step 69) and processing proceeds to step 88 (FIG.

4A). As the result of the search, in the case that the registration applicable to the service described in the <ACTION> tag 51 is found (yes in step 68), a search is subsequently made regarding whether or not description information of the authentication service and authorization service subjected to correspondence to the specified service exist (step 70).

As the result of the search in step 70, in the case that the description of the authentication service and authorization service subjected to correspondence to the specified service by the mapping script 6 is not found, the authentication and authorization processing as to this service is determined to be unnecessary, and the arbitrating service unit 3 notifies the execution permission to the SOAP processing unit 2 (step 71). In this case, the SOAP envelope is replied from the arbitrating service unit 3 to the SOAP processing unit 2. Processing then proceeds to step 88 (FIG. 4A).

As the result of the search in step 70, in the case that the description of the authentication service and authorization service subjected to correspondence to the specified service by the mapping script 6 is found, the arbitrating service unit 3 sends the SOAP envelope to the URL described in the mapping script 6 (step 72). The URL described in the mapping script 6 is the URL of the authentication-authorization service. In other words, the arbitrating service unit 3 sends the SOAP envelope to the authentication-authorization service. Processing then proceeds to step 73 (FIG. 4C) for processing of the authentication-authorization service. Below, the description of the arbitrating service unit 3 illustrated in FIG. 4B will be set aside, and the processing of the authentication-authorization service illustrated in FIG. 4C will be described.

As illustrated in FIG. 4C, it is determined whether the authentication-authorization service has received a SOAP envelope (step 73). In the case that the authentication-authorization service has received the SOAP envelope from the arbitrating service unit 3 (yes in step 73), the authentication-authorization service parses the description content of the SOAP envelope and acquires the UsernameToken information from the <UsernameToken> tag 52 illustrated in FIG. 5 (step 74). Next, the authentication-authorization service executes the authentication processing based upon the acquired UsernameToken (step 76). As a result thereof, in the case that the user information equivalent to the specified UsernameToken is determined to not be registered to the authentication-authorization service (no in step 76), the authentication-authorization service notifies an NG as an incorrect request to the arbitrating service unit 3 (step 77) and processing proceeds to step 97 (FIG. 4B).

As the result of the authentication processing in step 76, in the case that the user information equivalent to the specified UsernameToken is determined to be registered (=authentication OK) to the authentication-authorization service (yes in step 76), the authentication-authorization service reads out the content of the authorization script 16 which was previously validated by the EnableAuthScript, via the memory device control unit 5, and the searches whether or not the user name described as the content in the <Username> tag 53 illustrated in FIG. 5 is described in this authorization script 16 (step 78).

A determination is made as to whether the registration applicable to the user name described in the <Username> tag 53 is found as a result of the search (step 79). In the case that the registration applicable to the user name described in the <Username> tag 53 is not found as a result of the search (no in step 79), the authentication-authorization service processes the request described in the SOAP envelope sent from the arbitrating service unit 3 to the authentication-authorization service as having no execution restrictions or access restrictions. In this case, the authentication-authorization service generates a SOAP envelope according to, for example, the Security Assertion Markup Language (SAML) (step 81), and replies with this SOAP envelope to the arbitrating service unit 3 (step 82). After the reply processing is completed, the authentication-authorization service returns to step 73, and makes transition to wait to receive the SOAP envelope from the arbitrating service unit 3.

As a result of the search, in the case that the registration applicable to the user name described in the <Username> tag 53 is found (yes in step 79), the authentication-authorization service subsequently searches regarding whether or not the description information relating to the execution authorization and the access restrictions subjected to correspondence to the specified user exist (step 80). In the case that the description of the execution authorization and the access restrictions subjected to correspondence to the specified user in the authorization script 16 is not found as the result of the search (no in step 80), the authentication-authorization service processes the request described in the SOAP envelope sent from the arbitrating service unit 3 to the authentication-authorization service as having no execution restrictions or access restrictions. In this case, the authentication-authorization service generates a SOAP envelope according to the SAML 1.1 (step 81), and replies to the arbitrating service unit 3 with this SOAP envelope (step 82). After completing the reply processing, the authentication-authorization service returns to step 73 and makes the transition to wait to receive the SOAP envelope from the arbitrating service 3.

As the result of the search in step 80, in the case that the description of the execution authorization and the access restrictions subjected to correspondence to the specified user in the authorization script 16 is found (yes in step 80), the authorization script processing unit 15 parses the content of the body portion of the SOAP envelope sent from the arbitrating module unit 3 (step 83). The SOAP body portion in FIG. 5 illustrates a SOAP envelope in which the request content is described as to the printing service. In this example, with a <JobName> tag 54 the job name thereof is set as MyJob, and a <Color> tag 55 is set as FULLCOLOR, in other words full color printing, and a <Copy> tag 56 is set as 100, in other words 100 copies of printing, and a <Sides> tag 57 is set as ONESIDE, in other words one-sided printing, and with the <MediaSize> tag 58 the output paper size is set as A4, and with a <MediaType> tag 59 the type of output paper is set as PHOTOQUALITY, in other words photograph-quality bond paper, and with a <PrintQuality> tag 5A the printing quality is set as HIGH, in other words high-quality printing.

The authorization script processing unit 15 references the description relating to the execution authorization and the access restrictions described in the authorization script 16, and compares the content described in the authorization script 16 with the content in the body portion of the SOAP envelope. FIG. 6 illustrates a description example of the authorization script 16. In the example of FIG. 6 the description of the requestor XXX is excerpted, and the same description is stored for only the number of requestors registered on the authorization script 16. In FIG. 6, for the requester XXX the user name (username) allows BLACKANDWHITE, in other words black-and-white printing for a <Color> tag 61, and allows 10, in other words up to 10 copies of printing for a <Copy> tag 62, and allows TWO-SIDE, in other words two-sided printing for a <Sides> tag 63, and allows only the A4 size of output paper for a <MediaSize> tag 64, and allows only PLAINPAPER for the output paper type, in other words plain paper for a <MediaType> tag 65, and the allows printing quality to be HIGH, in other words high-quality printing for a <PrintQuality> tag 66.

As the result of the parsing in step 83, in the case that a request surpassing the access restriction is detected in the request content described in the SOAP envelope (step 84), authorization script processing unit 15 executes the rewriting of the request content described in the SOAP envelope body, according to the content of the authorization script 6 (step 85). Specifically, in the case of rewriting using the authorization script example illustrated in FIG. 6 as to the SOAP envelope body illustrated in FIG. 5, the request content from the requestor XXX relating to the items <Color>, <Copy>, <Sides>, and <MediaType> have been requesting surpassing the access restrictions, and the authorization script processing unit 15 changes the description content thereof as to each item.

Also, the authorization script processing unit 15 further describes the change history as to the SOAP header portion thereof (step 86). FIG. 7 illustrates an example of modifying as to the SOAP envelope in FIG. 5. As illustrated in FIG. 7, relating to the tag to be modified in the SOAP header portion, the request content before modifying is described respectively as the child tag of <ModifiedRequest> tag 71. The modified SOAP envelope is stored in the memory via the memory device control unit 5. Also, as illustrated in FIG. 7, the SOAP body portion modification has been made according to the authorization script 16 illustrated in FIG. 6, such as the <Color> tag 55 being rewritten as BLACKANDWHITE, or the <Copy> tag 56 being rewritten as 10.

If the above processing for all of the tags described as to the SOAP envelope body is not completed (no in step 87), processing returns to step 83 and is repeated. When the above processing for all of the tags described as to the SOAP envelope body is completed (yes in step 87), the authentication-authorization service adds on to the SOAP envelope based on the processing results according to the SAML 1.1 (step 81), and replies with the SOAP envelope to the arbitrating service unit 3 (step 82). After the reply processing is completed, the authentication-authorization service returns to step 73, and makes the transition to wait to receive the SOAP envelope from the arbitrating service unit 3. Next, the description will return to that of the processing of the arbitrating service unit 3, illustrated in FIG. 4B.

As illustrated in FIG. 4B, the arbitrating service unit 3 which has received the authentication results from the authentication-authorization service (yes in step 97) confirms whether or not there is any calling procedure description for the authentication-authorization service following the mapping script 6 (step 98), and in the case of having a description, the process is repeated from step 73 through step 80 of FIG. 4C. In the case that the description of the calling procedure for the authentication-authorization service with the mapping script 6 is completed (no in step 98), the arbitrating service unit 3 replies to the SOAP processing unit 2 with the authentication results received from the authentication-authorization service (step 99). After the reply processing is completed, the arbitrating service unit 3 returns to step 73, and makes the transition to wait to receive the SOAP header from the SOAP processing unit 2.

As described above, the arbitrating service unit 3 executes the calling for the authentication-authorization service as to the service specified for execution from the client PC 17, according to the description in the mapping script 6. Thus, the arbitrating service 3 can perform the various authentication-authorization services based on the description content of the mapping script 6.

With the mapping script 6 according to the present embodiment, a file name for identifying the mapping script 6 is described in the attribute name of the <xmlscript> tag. This file name is set by the scriptName specified by the previously-described UploadScript function. As the child tag of the <mapping> tag, the <Service> tag in which the applicable service information is described in the URL format, and the <AuthService> tag in which the authentication-authorization processing service information subjected to correspondence to this service is described in the URL format are defined.

FIG. 8 illustrates a first example of the mapping script 6. The file name of the mapping script 6 illustrated in FIG. 8 is "Sample1". As illustrated in the contents within the <mapping> tag in FIG. 8 (the <Service> tag and the <AuthService> tag), authentication-authorization services are subjected to correspondence to the following types of services in order from the top down.

Authentication-authorization service A associated with the printing service.
Authentication service B associated with the scanning service.
Authorization service B associated with the storage service.
Authentication-authorization service C associated with the FAX service.

The arbitrating service unit 3 performs different authentication-authorization services for each of the services, based on the mapping script 6 illustrated in FIG. 8. Accordingly, the arbitrating service unit 3 can process different authentication processes, such as for example, a password authentication for the printing service, a PIN code authentication for the scanning service, or an IC card authentication for the FAX service. Thus, the multi-function device M1 can realize appropriate security without losing efficiency or flexibility at the time of various services being provided by the service orientated architecture.

Figure 9:
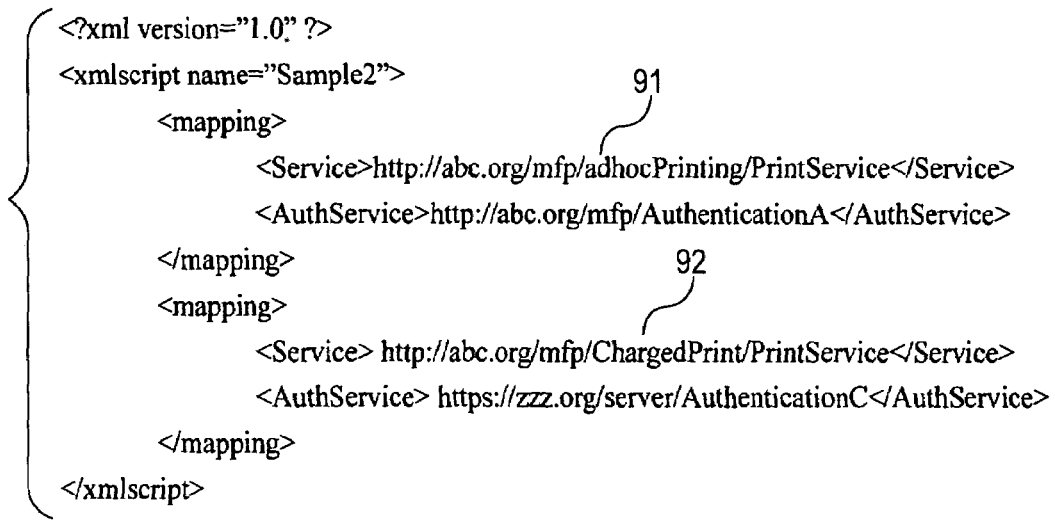
FIG. 9 illustrates a second example of the mapping script.

Next, several cases will be illustrated which are different from the example in the mapping script 6 illustrated in FIG. 8. FIG. 9 illustrates a second example of the mapping script 6. The mapping script 6 illustrated in FIG. 9 is a case wherein different authentication and authorization processes are performed for the same printing service. The ad hoc printing service defined in row 91 in FIG. 9 is a service for providing a simple printing function as to the client PC 17 which is connected to the network N1. This ad hoc printing service is a service for providing authentication and authorization processing by the authentication-authorization service A 7 implemented in the multi-function device M1 provided to the multi-function device M1. However, the charged printing service defined in row 92 is processed as a service which performs authentication-authorization processing with the authentication-authorization service C 14 in an operational state on the external side of the multi-function device M1 via the network N1.

From such a description, for example, the authentication-authorization service C 14 can perform a high security level authentication-authorization processing based on credit card numbers, passwords, and runtime passwords whereas the authentication-authorization service A 7 is a simple authentication-authorization service based on department codes.

Figure 10:
FIG. 10 illustrates a third example of the mapping script.

FIG. 10 illustrates a third example of the mapping script 6. The mapping script 6 illustrated in FIG. 10 illustrates the case that provides a scanning-storage service which is a new service, by combining the individually functioning scanning service and storage service. As illustrated in an entry 111 and entry 112 in FIG. 10, the authentication-authorization service A 7 and the authorization service B 8 are associated with the scanning service and storage service, respectively. Also, as illustrated in the entries 113 and 114 in FIG. 10, the authentication-authorization service C 14 is associated with the scanning-storage service which is the new service.

FIG. 11 illustrates a fourth example of the mapping script 6. The mapping script 6 illustrated in FIG. 11 associates both the printing service and the scanning service with the authentication-authorization service A 7, as illustrated in the entries 121 and 122. Thus, both services are processed based on a database managed by the authentication-authorization service C 14, and therefore authentication and authorization based on the same credential (certificate) information of the user client using both services can be performed, that is to say, a single-sign-on for the printing and scanning services can be performed.

FIG. 12 illustrates a fifth example of the mapping script 6. The mapping script 6 illustrated in FIG. 12 describes and subjects the authentication service B 8 and the authorization service B 9 to correspondence to the printing service. However, in this case, the arbitrating service unit 3 calls each identity and authorization service in the order described in this script. Therefore, the authentication processing is performed by the authentication service B 8, and by notifying the assertion given by this authentication service to the authorization service B 9, which is the next processing, the authorization information can be received. In other words, in the case that performing multiple authentication processing is necessary, or alternatively, in the case that separating the authentication processing and the authorization process and changing the combination thereof depending on the use thereof, the mapping script 6 such as that illustrated in FIG. 12 is described, and stored in the memory.

With the present embodiment, the multiple mapping scripts 6 illustrated in these examples 1 through 5 can be registered in the memory, and according to the description in the script specified with the EnableScript, the correspondence processing between the services and the authentication-authorization services can be performed. Accordingly, with the multi-function device M1 according to the present embodiment, by simply changing the description of the mapping script 6, the authentication-authorization processing can be changed or renewed depending on the usage. In other words, the multi-function device M1 can realize appropriate security without losing efficiency or flexibility at the time of various services being provided by the service orientated architecture.

Next, the processing in the SOAP processing unit 2 after the arbitrating service unit 3 has replied to the SOAP processing unit 2 with some processing results in steps 66, 69, 71, and 99 in the above-described FIG. 4B will be described with reference to FIG. 4A. As illustrated in FIG. 4A, the SOAP processing unit 2 having received the processing results from the arbitrating serving unit 3 (step 99) analyzes the processing results thereof (step 88). In the case that the processing results notified by the arbitrating service unit 3 is NG (error response) (no in step 89), a SOAP Fault as an incorrect request is replied to the client PC 17 which is the request client (step 90) and processing returns to step 61.

In the case that the processing results notified by the arbitrating service 3 is OK (yes in step 89), in other words, in the case that the SOAP envelope is sent from the arbitrating service unit 3, the SOAP processing unit 2 parses the service attribute information described in the SOAP body (step 91). Next, the SOAP processing unit 2 reads the attribute information as to the applicable services, and notifies this attribute information as to the service, and requests execution of the service (step 92). The flow then proceeds to the service processing flow illustrated in FIG. 4D.

As illustrated in FIG. 4D, upon receiving a service execution request (yes in step 100), the service receiving the service execution request from the SOAP processing unit 2 executes the service processing based on the notified job attributes (step 101), and the processing results thereof are replied to the SOAP processing unit 2 (step 102). Next, the service makes transition to wait to receive the service execution request from the SOAP processing unit 2, after the processing result reply. Thus, the flow proceeds to the processing of the SOAP processing unit 2 illustrated in FIG. 4A (step 93).

With FIG. 4A, the SOAP processing unit 2 having received the processing results from the service (yes in step 93) generates a SOAP response to the SOAP body based on the processing results thereof (step 94). Next, the SOAP processing unit 2 links the SOAP body unit and the SOAP header wherein the change history is stored based on the access restrictions and the assertion information to be replied to the client PC 17 by the authentication-authorization service via the arbitrating service unit 3, and generates a SOAP envelope for replying (step 95).

Next, the SOAP processing unit 2 replies with the envelope to the client PC 17 at the point in which the SOAP envelope generation is completed (step 96). After replying with the SOAP response, the SOAP processing unit 2 returns to step 61, and makes the transition to wait to receive the SOAP envelope from the client PC 17.

The client PC 17 which received the processing results as to the request analyzes the header portion of the SOAP envelope replied as necessary, and can determine whether or not any restriction processing is assigned to the requested job content, as well as the specific content thereof. By repeating the above-described string of processes, the authentication-authorization processing can be performed as to the specified service.

Other Embodiments

Various application examples and modification examples of the above-described embodiments will be described below. With the above-described embodiments, registering and sending to the mapping script processing unit 4 and the authorization script processing unit 15, is performed via the network N1 from an external device, this is to say, the administrative terminal PC 18 which is managed by a system administrator, has been described as for a method for registering, the mapping script 6 describing the correspondence between the service and authorization services, and the authorization and the access restriction information, but this does not need to be limited to these. For example, a server URL can be registered wherein the mapping script 6 and the authorization script 16 are registered as to the mapping script processing unit 4 and the authorization script processing unit 15 via the network N1 from the administrative terminal PC 18 which is managed by the system administrator. Thus, a configuration can be realized wherein the mapping script processing unit 4 and the authorization script processing unit 15 download the mapping script or authorization script from the server which has this URL, and registers this in the memory managed by itself.

Also, the computer and the above-described multi-function device M1 may be connected with a local interface such as a USB or IEEE1394, and registering the mapping script or authorization script can be realized as to the mapping script processing unit 4 and the authorization script processing unit 15 via this interface.

Also, the above-described script is stored in a storage media such as a compact disk—read-only memory (CD-ROM), a CompactFlash®, a memory stick, and the like, and from the storage media set so as to be capable of reading as to the multi-function device M1, a function can be provided to realize the mapping script processing unit 4 reading the mapping script, and the authorization script processing unit 15 reading the authorization script. Also, this script can be realized by having the administrator who has given authorization inputting the script via the operation unit provided on the multi-function device M1.

Also, with the above-described multi-function device M1 of the present embodiment, the information of the services and the authentication and authorization services subjected to correspondence to the services thereof have been described in the format of XML, but other script description languages or a simple text data can be used for the description. Similarly with the multi-function device M1 of the present embodiment, the information relating to the authorization and access restrictions as to the requestor using the services has been described in the format of XML, but other script description languages or a simple text data can be used for the description.

Also, with the exemplary embodiments described above, an example was described in which the mapping script processing unit 4 manages multiple mapping scripts 6, and the description of the specified mapping script 6 is validated, but a similar effect can be realized by describing multiple patterns as to one mapping script 6, and by specifying which pattern will be used.

FIG. 13 illustrates the association with the print service of the authentication and authorization services thereof according to the security level. For example, by the administrator, which has been given authorization for this security level, switching via the operation unit provided on the multi-function device M1, the printing service wherein authentication processing was not required with the security level 1, is changed to a printing service which is provided with authentication from an IC card and use restrictions different for each user, by switching to the security level 2.

Also, the above-described arbitrating service unit 3 was described above in the form of being implemented within a node of the multi-function device M1, but as illustrated in FIG. 14, the logic unit realizing the arbitrating service function can be independent on the external side via the network N1. In this case, the logic unit which realizes the arbitrating service function can be realized independently on the computer serving as the server, for example. In this case, the processing results for the authentication and authorization service requires protection so as not to be tampered with by a third party, for example by using Secure Socket Layer (SSL) 7 for the communication between the logic unit realizing the arbitrating service function and the multi-function device M1.

Similarly, with the above-described embodiment, the authentication-authorization service A 7 and the authorization service B 8 have been described in the form of being implemented within a node of the multi-function device M1, but do not need to be limited to this, and as illustrated in the authentication-authorization service C 14 in FIG. 1, can be in the form in which the logic unit which realizes the authentication-authorization service function is independent on the external side via the network N1. The logic unit which realizes the authentication-authorization service function can be realized by being implemented on a server from a computer, for example.

Figure 15:
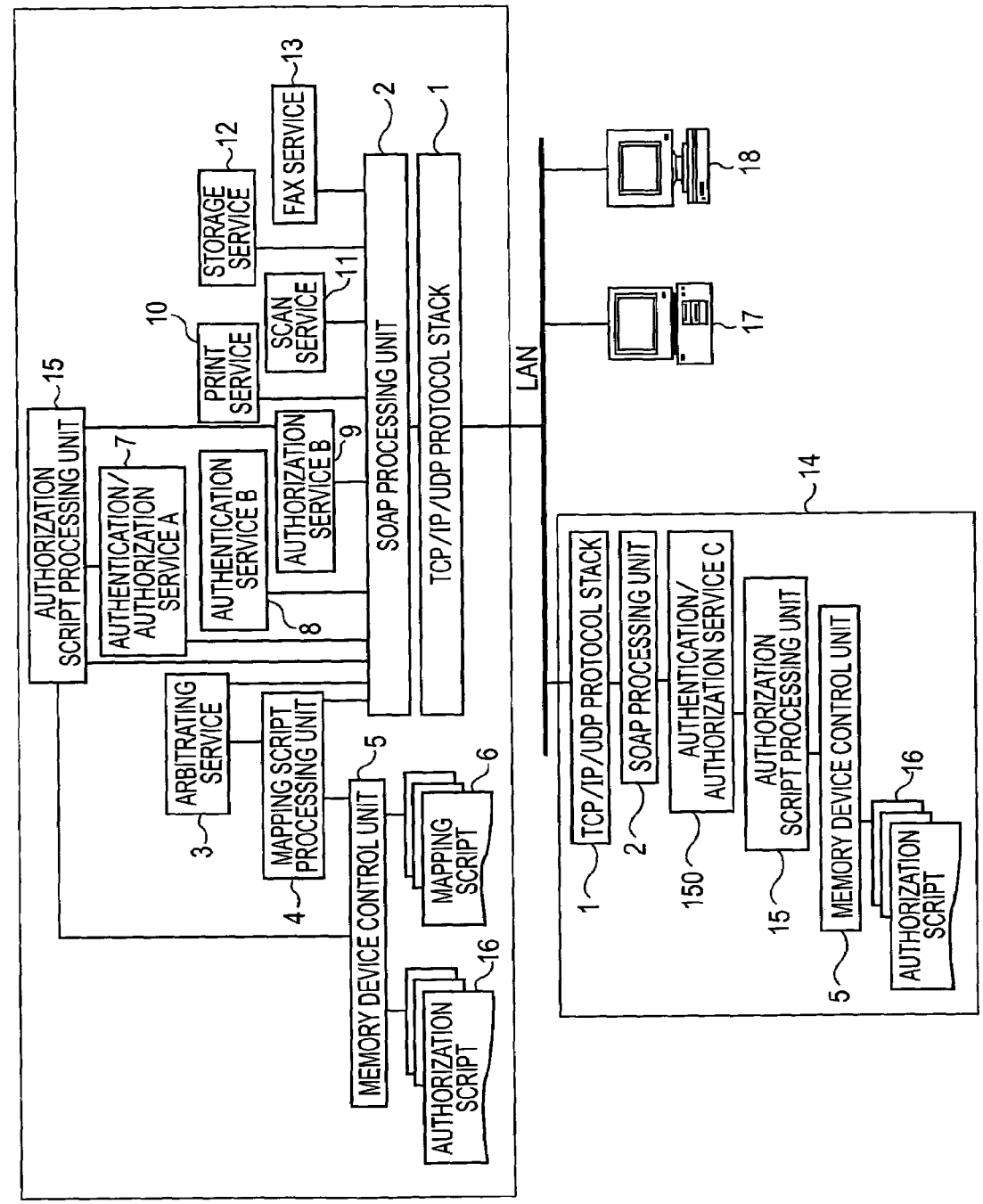
FIG. 15 illustrates a function configuration example of an authentication-authorization service.
Figure 18A:
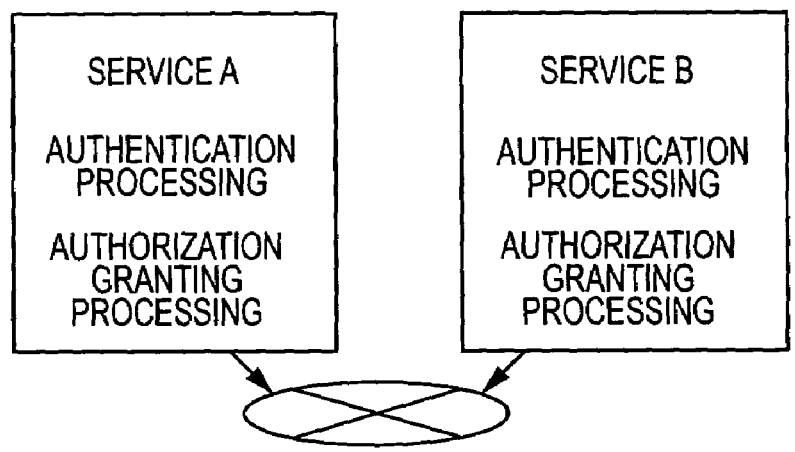
Figure 18B:
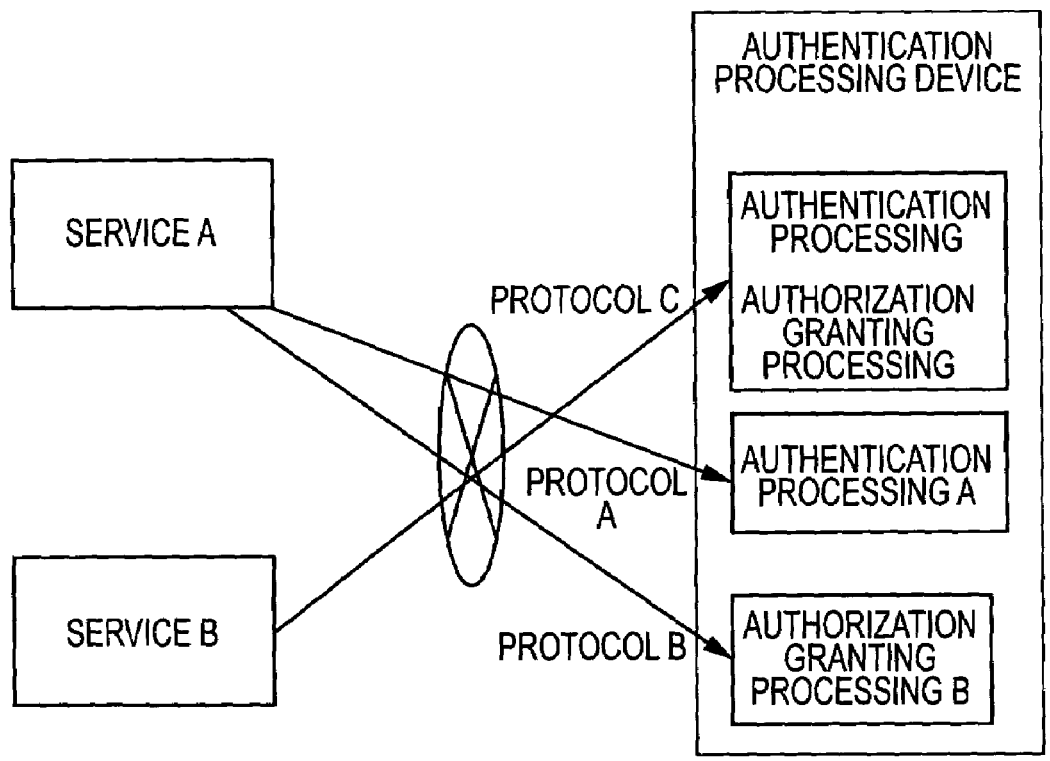
FIG. 18B illustrates a configuration example of an external device (authentication processing device) performing authentication and authorization on the external side of the multiple devices providing conventional services (service A or B).

FIG. 15 illustrates a function configuration example of the authentication-authorization service C 14. As illustrated in FIG. 15, the authentication-authorization service C 14 includes a TCP/IP/UDP protocol stack 1, a SOAP processing unit 2, an authentication-authorization service C processing unit 150, an authorization script processing unit 15, a memory device control unit 4, and an authorization script 16. The components which have the same reference numerals as in FIG. 1 have the same functions as those in FIG. 1.

Now, with the above-described embodiment, the arbitrating service unit 3 and the authentication and authorization service are communicating using a SAML protocol, but can be performed even in the case that this protocol is a protocol specifically for each authentication and authorization service, and the arbitrating service communicates based on the protocol corresponding to each authentication and authorization service. Thus, even in this case, the service does not consider the existence of the authentication and authorization services, and the most appropriate authentication and authorization processing can be performed for each use.

With the above-described embodiment, an example has been illustrated in which the description of the service name for the request is described based on the WS-Addressing specifications, but in the case that the (Action) tag cannot be detected with the arbitrating service, this can be performed by parsing the SOAP body portion, and acquiring the service name to be described there.

Also, with the above-described embodiment, an example has been illustrated in which the authentication information is described based on the regulations of the OASIS WS-security UsernameToken Profile, but authentication credentials not defined in these standard specifications can also be handled, and in this case, can be handled and performed by describing whether one of the tags of the mapping script is applicable to the credential information.

Also, with the above-described embodiment, a flow has been illustrated in which we can know that the control processing is performed as to the request content when the result of the request content thereof is rewritten is executed, and the requestor receiving the notification result as to the requestor analyzes the content described in the header portion of the results, in the case that the request content from the requestor surpasses the provided authorization and access restrictions. However, as another embodiment; in step 88 in FIG. 4A, the SOAP envelope is replied from the arbitrating service unit, and in the case that the <ModifiedRequest> tag is in the header thereof, the fact that the request has been modified is notified to the requester, and performing a control flow is possible wherein an execution request for the service is issued only in the case that a permission notification is received from the requestor (step 92 in FIG. 4A), and in this case, the requester can know, in advance of executing the service, the job content modified by the authorization server, and convenience is improved.

Also, the various processing units within the multi-function device M1 illustrated in FIG. 1 within the above-described present embodiment read out the program for the purpose of realizing the functions of the various processing units from the memory (for example, the HDD 103 in FIG. 17) and thus realizing the functions thereof by execution by the CPU 101, but the present invention is not limited to this, and all or part of the functions of the various processing can be realized by dedicated hardware. Also, the above-described memory is not limited to the HDD 103, and can include non-volatile memory such as a magneto-optical disk, flash memory or the like, a readable storage medium such as a CD-ROM or volatile memory other than random access memory (RAM), or a computer-readable/writable storage medium formed from a combination of these.

Also, a program for the purpose of realizing the various functions within the multi-function device M1 illustrated in FIG. 1 is stored on a storage medium capable of computer reading, and computer system reads in and executes this program stored on the storage medium, and thus the various processing can be performed. Now, the "computer system" mentioned here includes an OS or hardware such as peripheral devices and the like. Specifically, after the program read from the storage medium is written into the memory associated with the function enhancement unit connected to the computer or the function enhancement board inserted in the computer, based on the instructions of the program thereof, the CPU associated with the function enhancement board or function enhancement unit performs a portion or all of the actual processing, and includes the case in which the function of the above-described embodiment is realized by the processing thereof.

Also, the term "computer-readable storage medium" refers to a detachable medium such as a flexible disk, a magneto-optical disk, ROM, CD-ROM or the like, or a storage device such as hard disk or the like built into in the computer system. Further, the term "computer-readable storage medium" includes that which temporarily stores a program, such as volatile memory (RAM) within the computer system which is to serve as the client or a server, in the case that the program is sent via a communication line such as a telephone line or a network such as the Internet.

Also, the above-mentioned program can be transmitted from the computer system in which this program is stored on a storage device or the like, to another computer system, via a transmitting medium or by the transmitting waves in the transmitting medium. Here, the term "transmitting medium" which transmits the program refers to a medium which has the functionality to transmit information such as a communication line such as a telephone line or a network (communication network) such as the Internet. Also, the above-mentioned program may be for the purpose of realizing a part of the functions described above. Further, this may also be formed by combining programs wherein the above-described functions which are already stored in the computer system, which is a so-called difference file (difference program).

Also, a program product such as a storage medium and the like capable of computer reading of the above-mentioned stored program can be applicable as an embodiment of the present invention. The above-described program, recording medium, transmitting medium, and program product are included in the scope of the present invention. So far, the embodiments of the present invention have been described in detail with reference to the drawings, but the specific configurations do not need to be limited to these embodiments, and designs which do not depart from the spirit and scope of the present invention are also included.

The information processing device, the information processing method, and the program thereof according to the present embodiment, can easily realize the most appropriate security for a network service without losing the efficiency or flexibility thereof, with regards to a network service providing processing by a service orientated architecture.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-253198 filed Aug. 31, 2004, which is hereby incorporated by reference herein in its entirety.

What is claimed is:

1. An information processing device having a service accepting unit for accepting multiple service execution requests according to requests for services from an external terminal, the information processing device comprising: multiple types of authentication processing units configured to perform authentication processing before executing services, wherein each of the multiple types of authentication processing units takes different procedures; a first storage unit configured to store first information which is information wherein the calling procedure of the authentication processing corresponding to a service is described; an arbitrating processing unit having a function configured to call the authentication processing unit which performs authentication processing corresponding to services requested from the external terminal, and a function configured to receive and output a result of the authentication processing from the called authentication processing unit with reference to the first information from the first storage unit; a calling unit configured to call the service as to the service accepting unit, according to the result of the authentication processing output by the arbitrating processing unit; an editing unit configured to perform editing of the first information stored in the first storage unit based on an instruction from the external terminal, wherein the editing that can be performed includes at least setting, registration, renewals, deletions, and validations; a second storage unit configured to store second information which is information for determining security for each of the services according to a user of the external terminal or according to attributes of the user of the external terminal; wherein the authentication processing unit is configured to perform further authentication processing according to the user of the external terminal or the attributes of the user of the external terminal by referencing the second information from the second storage unit, wherein the second information stored in the second storage unit is described with a structured language, wherein the requests from the external terminal are described with the structured language, and the authentication processing unit is configured to perform modification using the structured language so that a request from the external terminal will be a request within the usage restrictions, if there is a request which surpasses the usage restrictions determined by the usage restriction information included in the second information to be referenced from the second storage unit.

2. The information processing device according to claim 1 wherein the second information to be referenced from the second storage unit is usage restriction information for determining usage restrictions as to the services according to the user of the external terminal; the authentication processing unit further comprises a function configured to modify a request so that a request from the external terminal will be a request within the usage restrictions, if there is a request which surpasses the usage restrictions determined by the usage restriction information included in the second information to be referenced from the storage unit; the arbitrating processing unit is configured to output the request modified by the authentication processing unit, together with results of the authentication processing; and the calling unit is configured to call the service according to results of the authentication processing output by the arbitrating processing unit.

3. The information processing device according to claim 1, wherein the second information stored in the second storage unit is information capable of at least setting registrations, renewals, deletions, and validation from the external terminal.

4. The information processing device according to claim 1, wherein
the arbitrating processing unit is configured to call at least one authentication processing unit according to the authentication processing calling procedures described in the first information, by referencing the first information from the first storage unit, accepting results of authentication processing from the called authentication processing units, and output the results of the authentication processing to the calling unit.

5. The information processing device according to claim 1, wherein the first information stored in the first storage unit is information associating information specifying the services with information specifying the authentication processing unit corresponding to the services.

6. The information processing device according to claim 1, wherein the first information stored in the first storage unit is described with a structured language.

7. The information processing device according to claim 1, wherein the authentication processing unit is configured to perform authentication processing of a user requesting the services as the authentication process, and restriction processing for restricting usage of at least a portion of the functions in the authentication process and the service.

8. An information processing method for an information processing device which performs authentication processing before accepting at least one or more independent services and executing the services according to a request from an external terminal, the information processing method comprising: a receiving step for receiving a service request including authentication information from the external terminal; an authentication processing calling step for calling the authentication processing corresponding to the received service request from multiple types of authentication processing provided by the information processing device referencing first information which describes an authentication processing calling procedure corresponding to the service, wherein each of the multiple types of authentication processing takes different procedures; a storing step for storing in a first storage unit, the first information which is information wherein the calling procedure of the authentication processing corresponding to a service is described; an output step for receiving and outputting results of the called authentication processing; a calling step for calling accepted services according to results of the authentication processing output in the output step wherein the first information stored in the first storage unit is information capable of at least setting registrations, renewals, deletions, and validations from the external terminal; a storing step for storing in a second storage unit, the second information which is information for determining security for each of the services according to a user of the external terminal or according to attributes of the user of the external terminal; wherein the authentication processing unit is configured to perform further authentication processing according to the user of the external terminal or the attributes of the user of the external terminal by referencing the second information from the second storage unit, wherein the second information stored in the second storage unit is described with a structured language, wherein the requests from the external terminal are described with the structured language, and the authentication processing unit is configured to perform modification using the structured language so that a request from the external terminal will be a request within the usage restrictions, if there is a request which surpasses the usage restrictions determined by the usage restriction information included in the second information to be referenced from the second storage unit.

9. A computer-readable storage medium having stored thereon a program to be executed on an information processing device which performs authentication processing before accepting at least one or more independent services and executing the services, according to a request from an external terminal, the program comprising: a receiving step for receiving a service request including authentication information from the external terminal; an authentication processing calling step for calling the authentication processing corresponding to the received service request from multiple types of authentication processing provided by the information processing device referencing first information which describes an authentication processing calling procedure corresponding to the service, wherein each of the multiple types of authentication processing units take different procedures; a storing step for storing, in a first storage unit, the first information which is information wherein the calling procedure of the authentication processing corresponding to a service is described; an output step for receiving and outputting results of the called authentication processing; a calling step for calling accepted services according to results of the authentication processing output in the output step, wherein the first information stored in the first storage unit is information capable of at least setting, registrations, renewals, deletions, and validations from the external terminal; a storing step for storing, in a second storage unit, the second information which is information for determining security for each of the services according to a user of the external terminal or according to attributes of the user of the external terminal; wherein the authentication processing unit is configured to perform further authentication processing according to the user of the external terminal or the attributes of the user of the external terminal by referencing the second information from the second storage unit, wherein the second information stored in the second storage unit is described with a structured language, wherein the requests from the external terminal are described with the structured language, and the authentication processing unit is configured to perform modification using the structured language so that a request from the external terminal will be a request within the usage restrictions, if there is a request which surpasses the usage restrictions determined by the usage restriction information included in the second information to be referenced from the second storage unit.

* * * * *